United States Patent [19]
Holt

[11] Patent Number: 5,495,561
[45] Date of Patent: Feb. 27, 1996

[54] OPERATING SYSTEM WITH OBJECT-ORIENTED PRINTING INTERFACE

[75] Inventor: L. Bayles Holt, San Jose, Calif.

[73] Assignee: Taligent, Inc., Cupertino, Calif.

[21] Appl. No.: 80,245

[22] Filed: Jun. 21, 1993

[51] Int. Cl.$^6$ .................................................. G06K 15/00
[52] U.S. Cl. ........................................ 395/114; 395/112
[58] Field of Search .................................. 395/117, 114, 395/115, 112, 133, 138, 275, 325

[56] References Cited

U.S. PATENT DOCUMENTS

| | | | |
|---|---|---|---|
| 4,589,068 | 5/1986 | Heinen, Jr. | 364/300 |
| 4,809,170 | 2/1989 | Leblang et al. | 364/200 |
| 4,910,663 | 3/1990 | Bailey | 200/20 |
| 4,943,932 | 7/1990 | Lark et al. | 364/513 |
| 4,953,084 | 8/1990 | Meloy et al. | 364/200 |
| 5,124,989 | 6/1992 | Padawer et al. | 371/19 |
| 5,129,086 | 7/1992 | Coyle, Jr. et al. | 395/650 |
| 5,140,671 | 8/1992 | Hayes et al. | 395/76 |
| 5,170,465 | 12/1992 | McKeeman et al. | 395/700 |
| 5,175,856 | 12/1992 | Van Dyke et al. | 395/700 |
| 5,182,806 | 1/1993 | McKeeman et al. | 395/700 |
| 5,187,789 | 2/1993 | O'Hair | 395/700 |
| 5,193,190 | 3/1993 | Janczyn et al. | 395/700 |
| 5,193,191 | 3/1993 | McKeeman et al. | 395/700 |
| 5,201,050 | 4/1993 | McKeeman et al. | 395/700 |
| 5,204,960 | 4/1993 | Smith et al. | 395/700 |
| 5,337,258 | 8/1994 | Dennis | 395/114 |
| 5,353,388 | 10/1994 | Motoyama | 395/117 |

FOREIGN PATENT DOCUMENTS 0545648  6/1993  European Pat. Off. .

OTHER PUBLICATIONS

Hewlett–Packard Journal, v. 43(4) Aug. 1992, Palo Alto, US, pp. 93–102, W. J. Allen, et al, "HP Deskwriter C Printer Driver Development".

Primary Examiner—Arthur G. Evans
Attorney, Agent, or Firm—Keith Stephens

[57] ABSTRACT

An object-oriented printing interface includes document grouping or folio objects which, once created, provide complete and flexible printing capability that is transparent to an application program. The printing interface objects include objects that are capable of automatically paginating printable information in several different formats, providing page composition including the addition of margins, footnotes, page numbers and registration marks, n-up printing and page imposition and combining text material with graphic material.

46 Claims, 32 Drawing Sheets

OPERATING SYSTEM WITH OBJECT-ORIENTED PRINTING INTERFACE

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office.

1. Field of the Invention

This invention generally relates to improvements in computer systems and, more particularly, to operating system software for printing graphics and textual documents.

2. Background of the Invention

One of the most important aspects of a modem computer system is the ability to generate a "hard" copy of textual information or graphics which can be manipulated by the computer, visually displayed and stored. In order to accomplish this task, a computer system generally includes a printing device which is electrically connected to the computer system and controlled by it in order to generate a permanent image on a selected medium. Examples of printing devices in common use are dot matrix, ink jet and laser printers which fix permanent images on paper under control of the computer. Although paper is the most common medium, other media are often used, such as photographic film.

In order to print a document which is displayed on the monitor or stored within the memory, several actions must take place. First, since the print medium generally has a fixed size, the printable information must be divided into pieces which are small enough to fit on the selected medium, a process which is called pagination. In addition, the information may need to be reformatted from the format in which it is either displayed or stored into a format which is suitable for controlling the printing device to actually perform the printing on the medium. The reformatting in this latter step may include the insertion of control commands into the printable information in order to control the printing device. These added commands may, for example, include such commands as carriage returns, line feeds, form feeds, spaces and font information, all of which format the printable information. The reformatting may also include a conversion step in which a graphical display is converted into the form used by the printing device.

The pagination and reformatting necessary to convert the printable information into a form which can be printed a given printing device is generally performed by software programs running within the computer system. Software programs operating on a computing system generally can be categorized into two broad classes: operating systems which are usually specific to a type of computer system and consist of a collection of a utility programs that enable the computer system to perform basic operations, such as storing and retrieving information on a peripheral disk memory, displaying information on an associated video display, performing rudimentary file operations including the creation, naming and renaming of files and, in some cases, performing diagnostic operations in order to discover or recover from malfunctions.

By itself, the operating system generally provides only very basic functions and must be accompanied by an "application" program. The application program interacts with the operating system to provide much higher level functionality and a direct interface with the user. During the interaction between the application program and the operating system, the application program typically makes use of operating system functions by sending a series of task commands to the operating system which then performs the requested tasks. For example, the application program may request that the operating systems store particular information on the computer disk memory or display information on the video display.

FIG. 1 is a schematic illustration of a typical computer system utilizing both an application program and an operating system. The computer system is schematically represented by dotted box 100, the application program is represented by box 102 and the operating system by box 106. The interaction between the application program 102 and the operating system 106 is illustrated schematically by arrow 104. This dual program system is used on many types of computers systems ranging from mainframes to personal computers.

The method for handling printing, however, varies from computer to computer, and, in this regard, FIG. 1 represents a prior art personal computer system. In order to provide printing functions, the application program 102 interacts (as shown schematically by arrow 108) with printer driver software 110. Printer driver software 110 is generally associated with an application program and reformats and converts the printable information as necessary. Since each printer has its own particular format and control command set, which must be embedded in the text properly to control the printer, the printer driver software 110 must be specifically designed to operate with one printer or one type of printer.

The printer driver software 110 produces a reformatted information stream containing the embedded commands as shown schematically as arrow 114. The converted information stream is, in turn, applied to a printer port 112 which contains circuitry that converts the incoming information stream into electrical signals. The signals are, in turn, sent over a cable 116 to the printer 118. Printer 118 usually contains a "imaging engine" which is a hardware device or a ROM-programmed computer which takes the incoming information stream and converts it into the electrical signals necessary to drive the actual printing elements. The result is a "hard copy" output on the selected medium.

While the configuration shown in FIG. 1 generally works in a satisfactory manner, it has several drawbacks. Since the printer driver software 110 is specific to each type of printer, a separate driver had to be provided for each printer type with which the application program is to operate. In the personal computer market, there are a large number of different printer types that are compatible with each type of computer and, therefore, as the number of printer types proliferated, so did the number of printer drivers which were required for each application program so that the program was compatible with most available printers. Therefore, application program developers had to provide larger and larger numbers of printer drivers with each application program, resulting in wasted time and effort and wasted disk space to hold the drivers, only one or two of which were of interest to any particular user. Unfortunately, if a user purchased an application program and it did not include a printer driver which could control the printer which the user owned, unpredictable operation occurred, resulting in program returns and user dissatisfaction.

In addition, it was also necessary for each application program to provide high level printing functions such a is pagination and page composition (including addition of margins, footnotes, figure numbers, etc.) if such functions were desired. Consequently, each application program developer had to spend time developing programs to implement common printing functions which programs were specific to each application program, thereby resulting in duplicated effort and wasted time.

In order to overcome the aforementioned difficulties, the prior art arrangement was modified as shown in FIG. 2. In this new arrangement, computer system 200 is still controlled by application program 202 which cooperates, as shown schematically by arrow 204, with operating system 206. However, in the system shown in FIG. 2 operating system 206 includes printer drivers 214. A separate printer driver must still be provided for each different type of printer, but the printer drivers are sold with, and part of, the operating system. Consequently, it is not necessary for each application program to have its own set of printer drivers. An application program, such as application program 202, communicates with the printer driver 214 by means of a standardized interface 210. Two common interfaces are called "grafports" or "device contexts". Illustratively, application program 202 provides information (shown schematically shown by arrow 208) in a standardized form to the grafport 210. The grafport 210, in turn, forwards information, as shown by arrow 212, to printer driver 214 which reformats and converts the information as previously described into the format required by the printer. The output of printer driver 214 is provided (illustratively shown as arrow 216) to printer port 218 where it is converted to electrical signals that are transmitted, via cable 220, to the printer 222.

The configuration shown in FIG. 2 has the advantage that the application program developer need not worry about the specific computer and printer combination on which the program will ultimately run in order to provide printing capabilities to the application program. However, it still suffers from the drawback that, if desired, high level printing capabilities such as pagination and page composition must still be designed into each application program, thereby duplicating program code and wasting programming resources.

Accordingly, it is an object of the present invention to provide a flexible, and largely autonomous, printing interface so that an application program can provide high level printing capabilities by means of a simple command structure without being concerned with actual implementation details.

It is another object of the present invention to provide a flexible printing interface which allows application program developers who need detailed control over the printing process to achieve this control by means of a full set of printing commands which are available, but need not be used, by each application program.

SUMMARY OF THE INVENTION

The foregoing problems are overcome and the foregoing object is achieved in an illustrative embodiment of the invention in which an object-oriented printing interface includes document grouping or folio objects which, once instantiated provide complete and flexible printing capability that is transparent to the application program. The printing interface objects include objects that are capable of automatically paginating printable information in several different manners, providing page composition including the addition of margins, footnotes, page numbers and registration marks and combining text material with graphic material.

The inventive object-oriented printing interface communicates with the remainder of the operating system by means of a standard interface such as a grafport and printer drivers are provided for each printer type within the operating system. Thus, an application not only need not worry about the particular printer/computer combination with which it is to operate, but also need not have a built in document formatting capability.

BRIEF DESCRIPTION OF THE DRAWINGS

The above and further advantages of the invention may be better understood by referring to the following description in conjunction with the accompanying drawings, in which.

DETAILED DESCRIPTION OF THE ILLUSTRATIVE EMBODIMENTS

Figure 1:
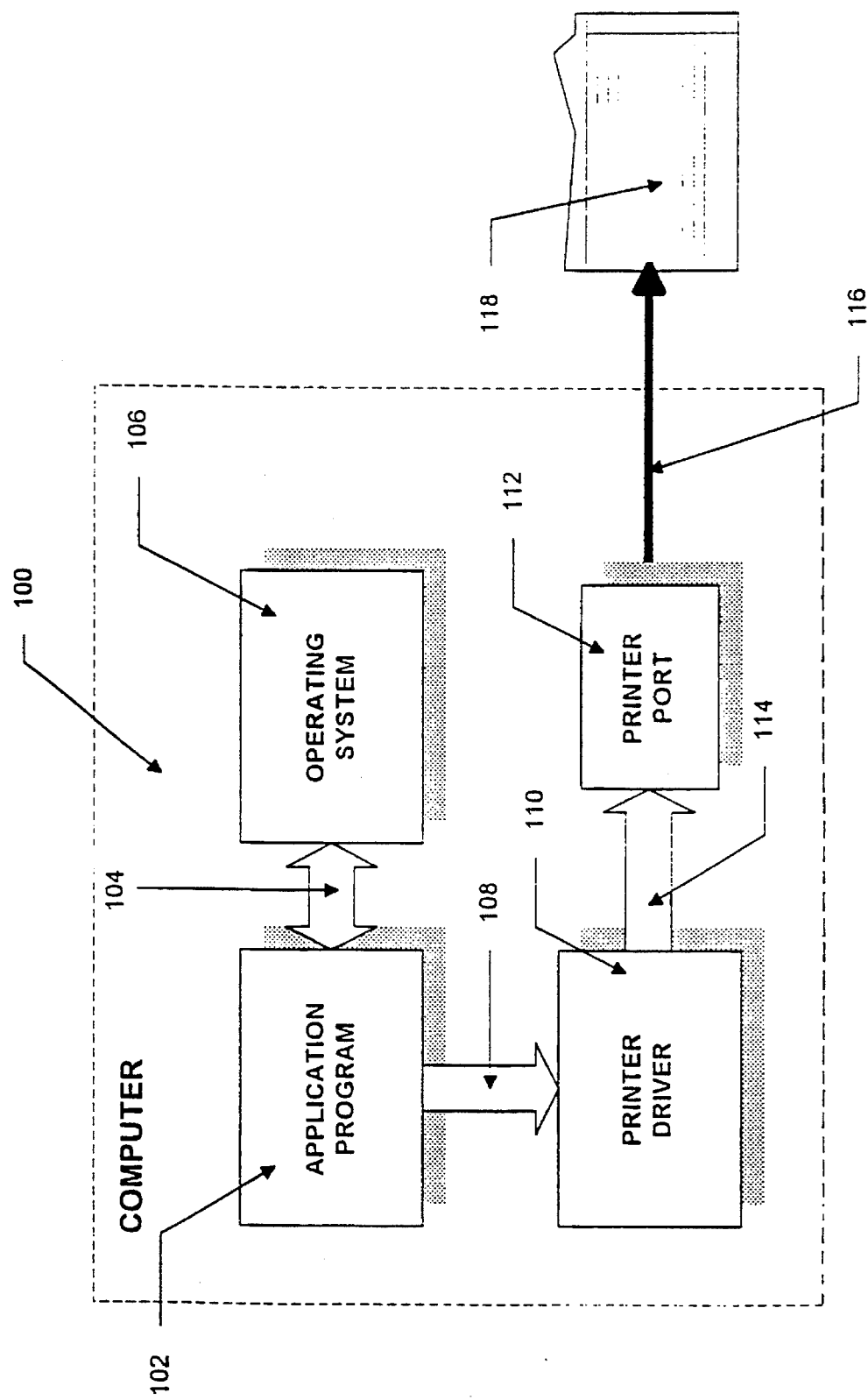
FIG. 1 is a schematic block diagram of a prior art computer system showing the relationship of the application program to the operating system and the printer driver.
Figure 2:
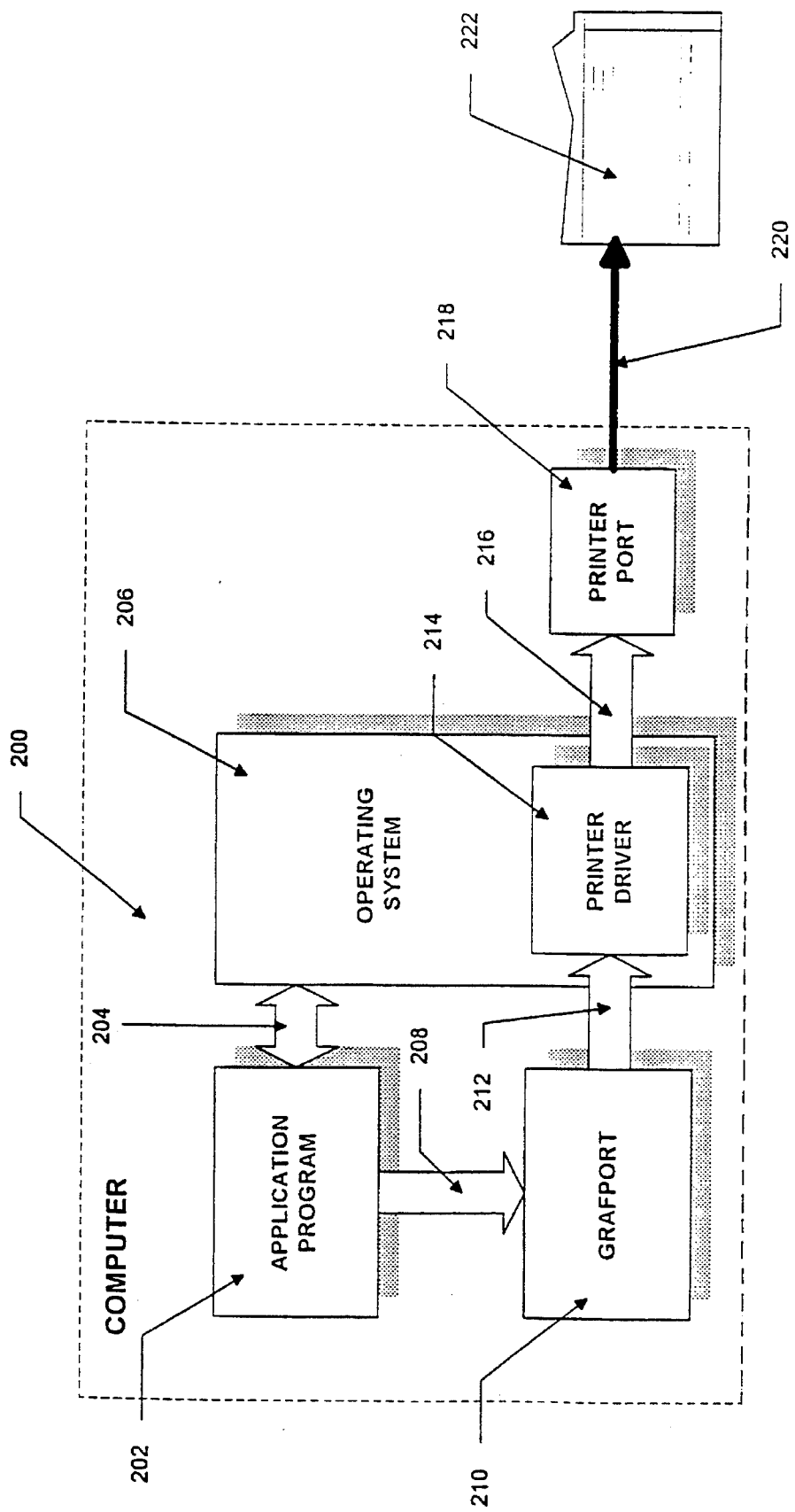
FIG. 2 is a schematic block diagram of a modification of the prior art system shown in FIG. 1 to allow the application program to interface to a standard printing interface.
Figure 3:
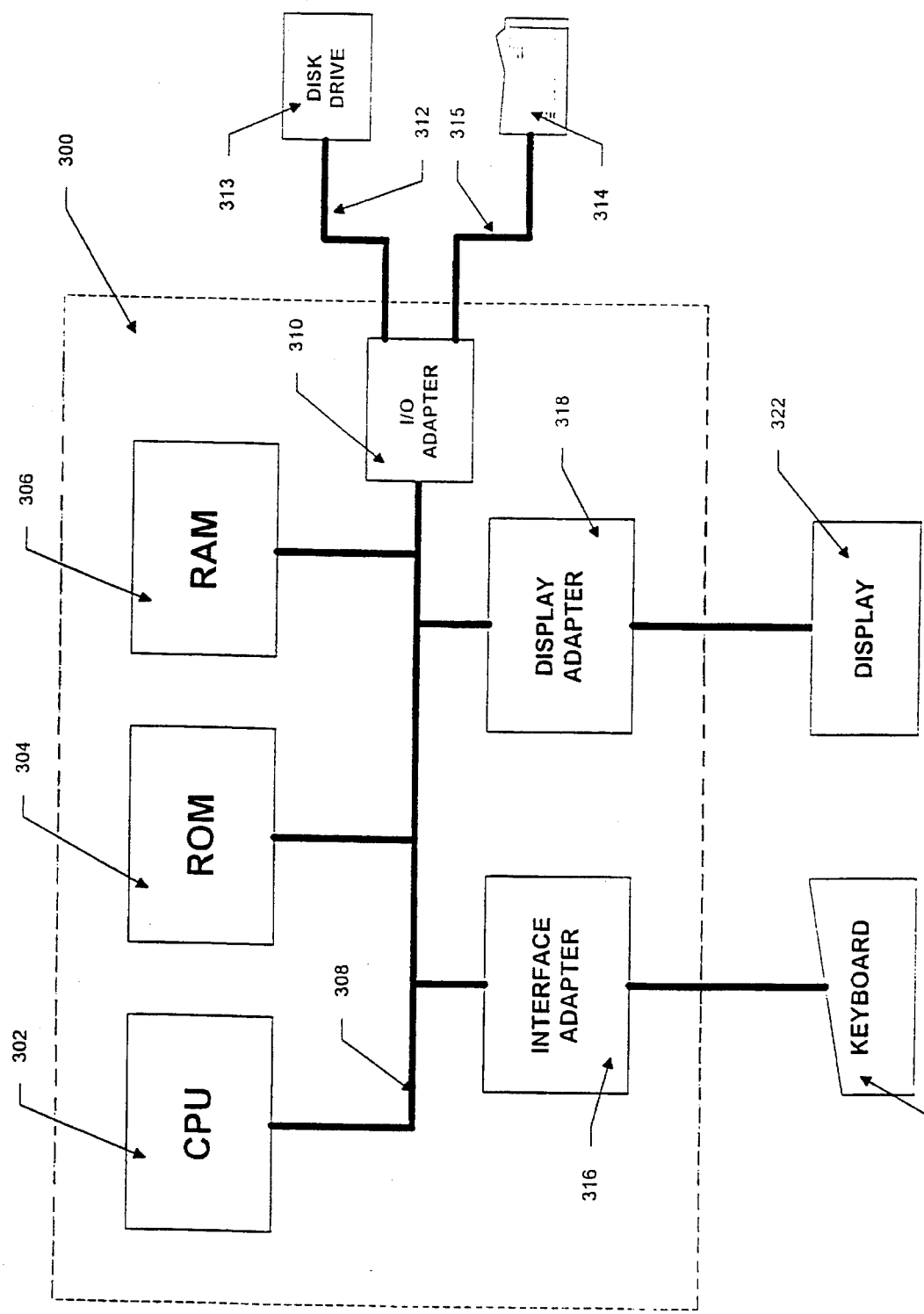
FIG. 3 is a block schematic diagram of a computer is system, for example, a personal computer system on which the inventive object-oriented printing interface operates.

The invention is preferably practiced in the context of an operating system resident on a personal computer such as the IBM, PS/2, or Apple, Macintosh, computer. A representative hardware environment is depicted in FIG. 3, which illustrates a typical hardware configuration of a computer 300 in accordance with the subject invention. The computer 300 is controlled by a central processing unit 302, which may be a conventional microprocessor; a number of other units, all interconnected via a system bus 308, are provided to accomplish specific tasks. Although a particular computer may only have some of the units illustrated in FIG. 3 or may have additional components not shown, most computers will include at least the units shown.

Specifically, computer 300 shown in FIG. 3 includes a random access memory (RAM) 306 for temporary storage of information, a read only memory (ROM) 304 for permanent storage of the computer's configuration and basic operating commands and an input/output (I/O) adapter 310 for connecting peripheral devices such as a disk unit 313 and printer 314 to the bus 308, via cables 315 and 312, respectively. A user interface adapter 316 is also provided for connecting input devices, such as a keyboard 320, and other known interface devices including mice, speakers and microphones to the bus 308. Visual output is provided by a display adapter 318 which connects the bus 308 to a display device 322 such as a video monitor. The workstation has resident thereon and is controlled and coordinated by operating system software such as the Apple System/7, operating system.

In a preferred embodiment, the invention is implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements and routines, or functions, which manipulate the data elements. The data and related functions are treated by the software as an entity and can be created, used and deleted as if they were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the functions which manipulate the data. An object is actually created in the program by means of a special function called a constructor which uses the corresponding class definition and additional information, such as arguments provided during object creation, to construct the object. Likewise objects are destroyed by a special function called a destructor. Objects may be used by using their data and invoking their functions.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, during compilation, the C++ compiler will determine which of the three functions is actually being used by examining the variable types. The compiler will then substitute the proper function code. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Although object-oriented programming offers significant improvements over other programming concepts, program development still requires significant outlays of time and effort, especially if no pre-existing software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "application frameworks" and essentially provide a pre-fabricated structure for a working application.

For example, an application framework for a user interface might provide a set of pre-defined graphic interface objects which create windows, scroll bars, menus, etc. and provide the support and "default" behavior for these graphic interface objects. Since application frameworks are based on object-oriented techniques, the pre-defined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of application frameworks available, depending on the level of the system involved and the kind of problem to be solved. The types of frameworks range from high-level application flameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NEXT), and Smalltalk-80 MVC (ParcPlace).

While the application framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, application frameworks generally consist of one or more object "layers" on top of a monolithic operating system and even with the flexibility of the object layer, it is still often necessary to directly interact with the underlying operating system by means of awkward procedural calls.

In the same way that an application framework provides the developer with prefab functionality for an application program, a system framework, such as that included in a preferred embodiment, can provide a prefab functionality for system level services which developers can modify or override to create customized solutions, thereby avoiding the awkward procedural calls necessary with the prior art application frameworks programs. For example, consider a printing framework which could provide the foundation for automated pagination, pre-print processing and page composition of printable information generated by an application program. An application software developer who needed these capabilities would ordinarily have to write specific routines to provide them. To do this with a framework, the developer only needs to supply the characteristics and behavior of the finished output, while the framework provides the actual routines which perform the tasks.

A preferred embodiment takes the concept of frameworks and applies it throughout the entire system, including the application and the operating system. For the commercial or corporate developer, systems integrator, or OEM, this means all of the advantages that have been illustrated for a framework such as MacApp can be leveraged not only at the application level for such things as text and user interfaces, but also at the system level, for services such as printing, graphics, multi-media, file systems, I/O, testing, etc.

Figure 4:
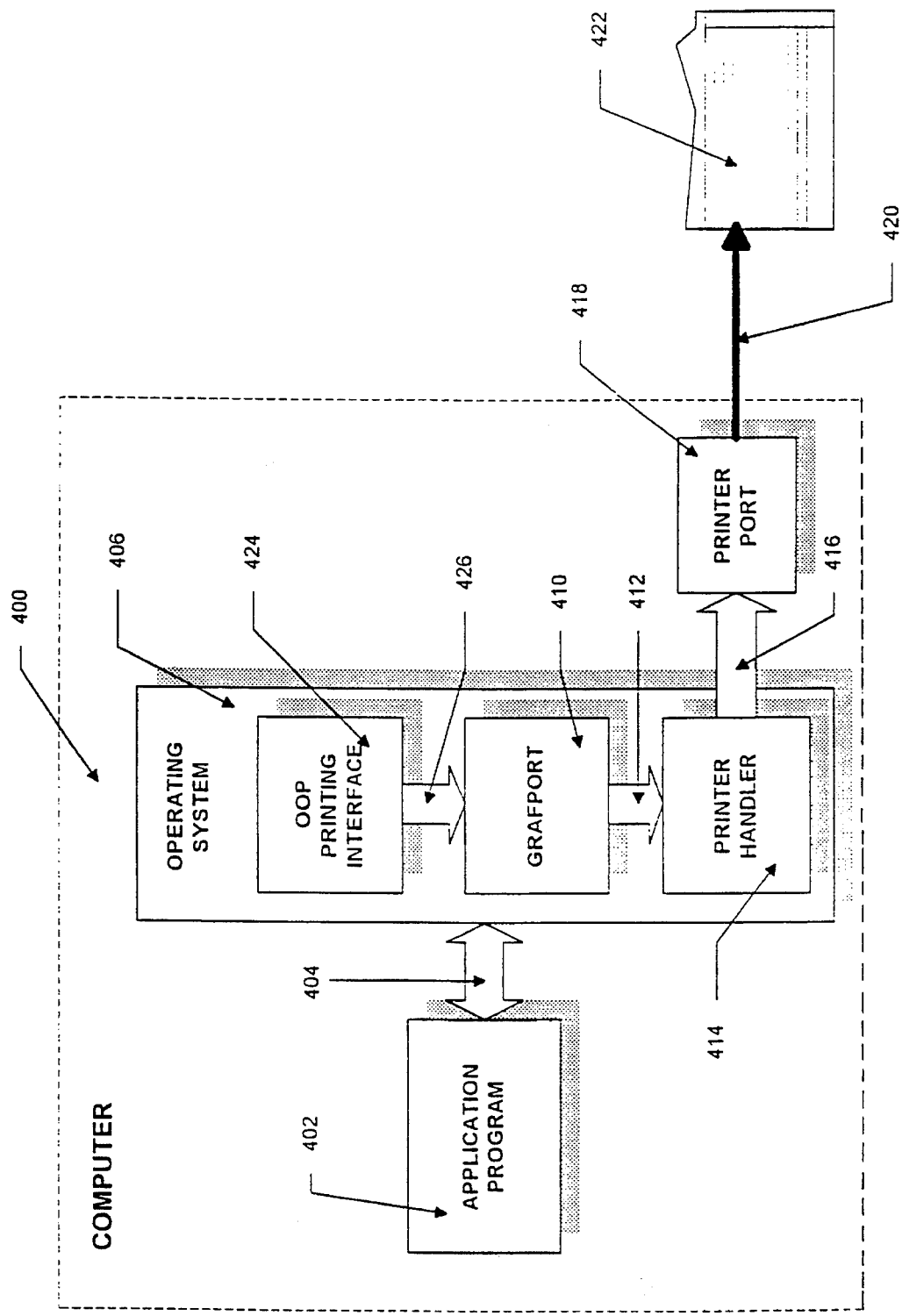
FIG. 4 is a schematic block diagram of modified computer system in which the operating system includes an inventive object-oriented printing interface.

FIG. 4 shows a schematic overview of an computer system utilizing the object-oriented printing interface of the present invention. The computer system is shown generally as a dotted box 400, and an application program 402 and an operating system 406 are provided to control and coordinate the operations of the computer. Application program 402 communicates with operating system 406 as indicated by arrow 404. However, in accordance with an embodiment of the invention, rather than communicating directly with a standard interface, such as grafport 410, application program 402 can now communicate with operating system 406 at a higher level when it wishes to print information. This latter interaction is accomplished by providing an objects oriented printing interface shown schematically as box 424. As will hereinafter be described in detail, printing interface 424 responds to a series of simple commands generated by application program 402 in order to perform various formatting and pagination functions. The formatted, printable information is then transmitted to a grafport 410 as indicated schematically by arrow 426. It is possible for application program 402 to communicate directly with grafport 410 as in the prior art arrangement, however, it is not contemplated that most applications will do this unless special procedures are needed.

In any case, the information flows through grafport 410, and as indicated by arrow 412, is provided to a printer handler 414. Printer handler 414 is similar to printer drivers previously described. However, it is "intelligent" and offers some additionally capabilities which will be described herein. Essentially, printer handler 414 processes the incoming data stream indicated by arrow 412 and adds the necessary printer commands to control the associated printer schematically illustrated as printer 422. The reformatted data is provided, as indicated by arrow 416, to a printer port 418 which converts the data into electrical signals that are sent over cable 420 to printer 422.

Figure 5:
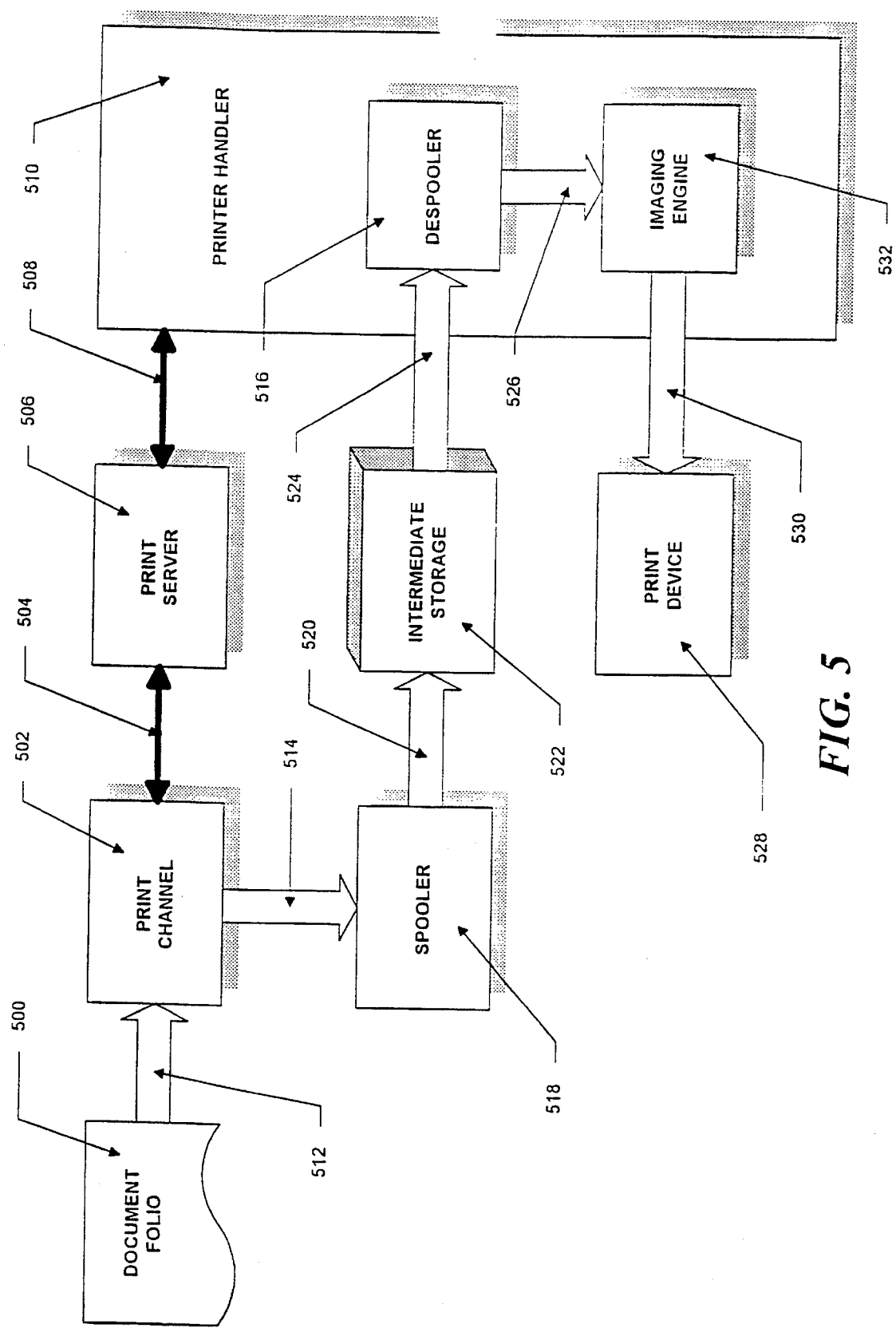
FIG. 5 is a block schematic diagram of the information paths and hardware by which printable information is channeled through intermediate storage to a print device.

The actual mechanism by which a document generated by the printing interface 424 is transmitted to printer 422 is shown in more detail in FIG. 5. In particular, printing interface 424 (as will hereafter be described in detail) generates an entity called a document folio shown schematically as document folio 500 in FIG. 5. The document folio may consist of text, graphics or a combination of the two, all formatted and arranged in a manner specified by the application program. The document folio information is provided, as indicated by arrow 512, to a print channel 502. Print channel 502 is an object which is created to transport the information to an appropriate printer. Print channel uses a print job description and a printer identification provided by the application program to transmit the printable information to the appropriate printer.

More specifically, after the print channel 502 receives a printing job, it transmits the printable information to a spooler program 518 as indicated by arrow 514. Spooler 518 receives the incoming information stream and stores it, in incoming order, in an intermediate storage location 522 as indicated by arrow 520. Print channel 502 then sends a notification to a print server program 506 via a link 504, which notification informs print server program 506 that a new print job exists. The print server program 506 is standard program which monitors all print jobs that have been created and also checks the available printers to determine their status.

Once a print job has been completely spooled or stored in intermediate storage 522, the print server 506 notifies a printer handler 510 by means of a link 508. The printer handler 510 is type of printer driver which controls and drives a specific printer; its purpose is to convert text and graphic information into printer readable form for any particular printer type. Typically, a printer handler can only process one print job and any other jobs that are created and directed towards the associated printer are queued for later processing. The printer handler contains a despooler program (indicated as box 516) which retrieves the spooled data from intermediate storage 522 (as indicated by arrow 524) and provides the information, as indicated by arrow 526, to an imaging engine schematically illustrated as box 532. The imaging engine 532 converts the incoming data stream into the command signals which are necessary to drive the printing elements to produce the final printed document. The commands, indicated schematically by arrow 430, are provided to the actual print device indicated by box 528 for printing.

Once a print job is completely printed, the printer handler 510 checks its queue for another print job and, if a job is present, begins processing it. Alternatively, if there are no new print jobs to process, the printer handler becomes inactive. After a particular print job is completed, the information stored in intermediate storage in 522 is deleted and the storage is reclaimed.

The preparation of the document portfolio in which the formatted printable information is held prior to printing will now be described in detail. As shown schematically in FIG. 6, an application program 600 interacts with the inventive printing interface 602 via four main printing objects, 604–610. These pre-defined objects are created by the application program as needed and perform specific operations on the printable information in order paginate the information in a variety of different ways, combine text and graphics and also perform print preprocessing, including changes in format and size and the addition of adornments like page numbers or borders.

Although the operation of the four main printing objects will be described in detail below, in general, each object receives from the application program a specification to a "view" which identifies the printable information. As used herein, a "view" is defined as a rectangular area which contains printable information, this information may include text, graphics, a combination of text and graphics, bit-mapped areas or any other information which can be printed on a printing device. In this respect, the view is more like the information as stored in the computer's memory, rather than the information displayed on the computer display terminal. For example, a view may include all of the text information in a word processing document, whereas during the operation of the word processing program, the text information is divided into pieces for viewing. Alternatively, a view can consist of a large graphical area such as that generated by drawing program, for example, the APPLE MacDraw program.

A view is "specified" by defining a rectangular region by means of the x,y coordinates corresponding to the upper left hand corner of the rectangle and x,y coordinates corresponding to the lower right hand corner of the rectangle. The four printing objects identified in FIG. 6 cover four different ways in which a view can be paginated and in which a page folio can be constructed. For example, the tiled page folio object 604 corresponds to pagination in a manner similar to the MacDraw program or a spreadsheet program in which the view is divided into contiguous pages with no intervening gaps. When using this object, the application program can specify either an integral number of full pages to cover the entire view area with the margin as the remainder or the application program can specify partial pages at the view edges and the margin can be set independently.

Figure 6:
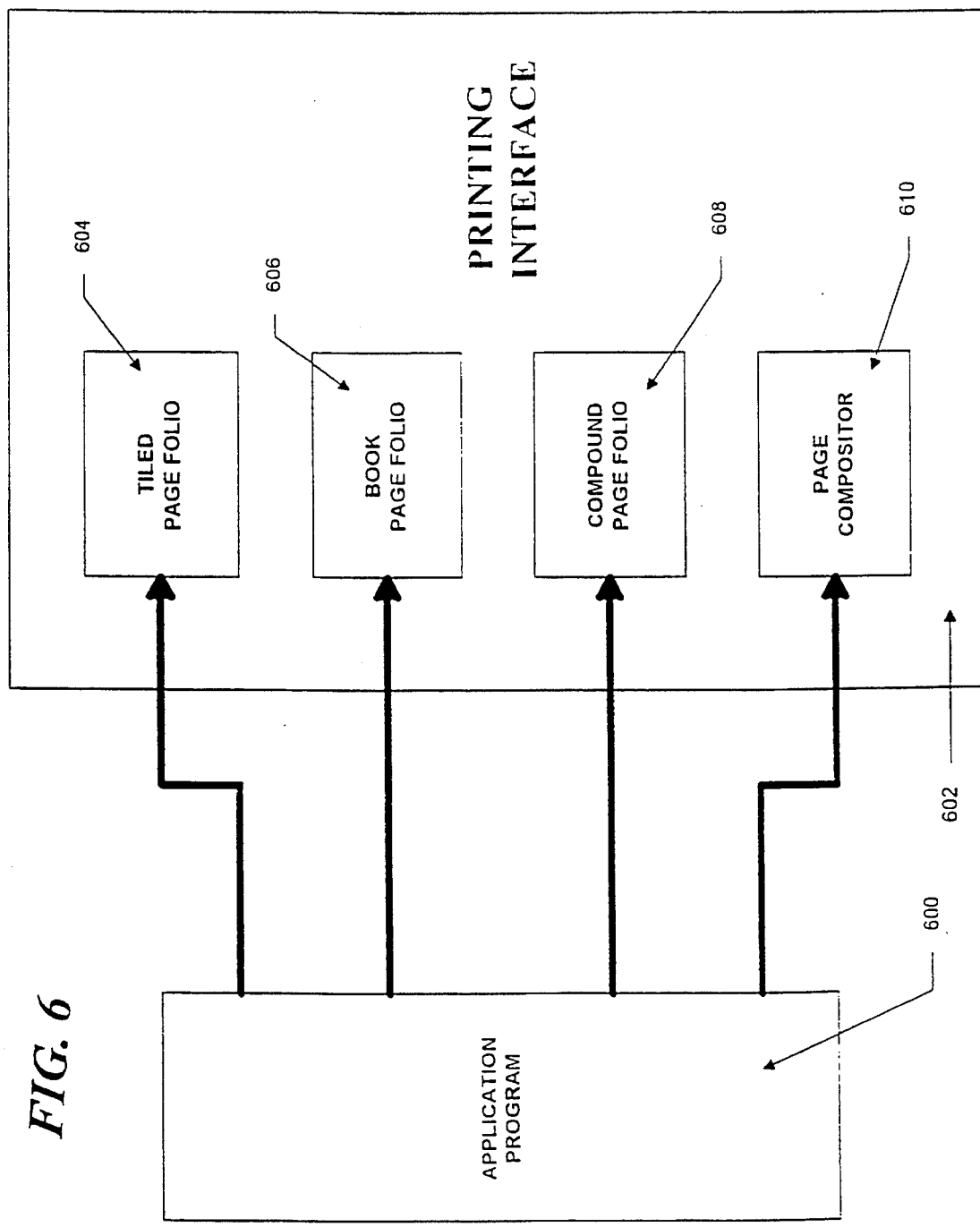
FIG. 6 is a schematic diagram showing illustrative printing objects in the printing interface which can be referenced by the application program.

The object identified as the book page folio 606 in FIG. 6 is similar to the filed page folio 604 except that the specified pages are whole pages with gaps between the pages. The pagination performed by this model is similar to that performed by a typical word processor application such as the MacWrite application in which the printable information is broken into "pages", each with its own margins or borders. Accordingly, this model is referred to as the "MacWrite" model.

The compound page folio object 608 shown in FIG. 6 can be used by the application program to generate collections of other page folio types. In this respect, it acts like a page queue and other page folios can be added to it and removed from it. In addition, it can accept other compound page folios. It is useful in order to combine page folios of different types, for example, a filed page folio object may be combined with a book page folio object and the entire collection printed as a unit.

The last printing object designated the page compositor object 610 operates as a pre-print processor for regular printable documents; composition in this context is equivalent to taking an existing folio, pulling it apart, rearranging the pieces and putting them back together with a new format, new size, new binding and optionally some adornments such as page numbers or borders. Composition is an optional process that can be executed on any other type of page folio and the page compositor object can be applied to any page folio target and to other page compositor objects so that the page compositors can be nested to any depth with each compositor adding a particular adornment or modification to the information passing through it. Consequently, a page compositor object can be printed, but it cannot print without a target, that is, it must have something else to print. In this respect it acts very much like an iterator. The inventive printing interface includes many different types of page compositors. For example, compositors exist that create imposition arrangements and n-up printing.

As previously mentioned each of the objects shown in FIG. 6 comprises data and functions that operate on that data. In order to understand the operation of each of the objects it is useful to look at the construction of the objects and some of the major function routines that comprise the behavior of the object. In examining the objects it is useful to examine the classes that are used to construct the objects (as previously mentioned the classes serve as templates for the construction of the object). Thus, the relation of the classes and the functions inherent in each class can be used to predict the behavior of an object once it is constructed.

TILED PAGE FOLIO OBJECT

Figure 7:
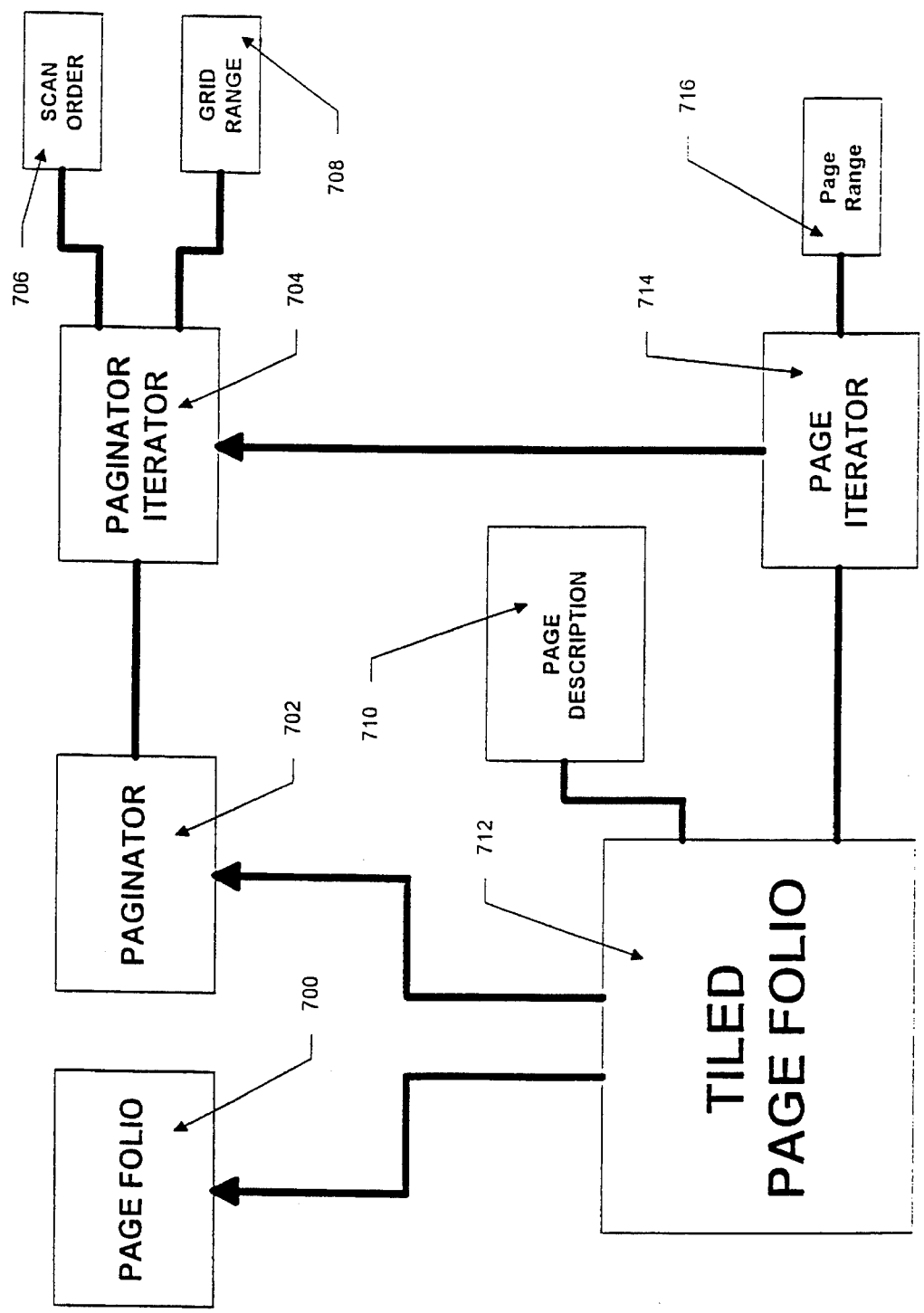
FIG. 7 is a simplified class hierarchy diagram illustrating the base, subclasses and associated classes involved in the construction of a filed page folio object.

FIG. 7 shows a simplified class hierarchy diagram for the tiled page folio object 604. FIG. 7 illustrates some of the classes that are used to construct the tiled page folio object. In particular, the class (illustrated by box 712) used to construct the tiled page folio object is a subclass of two base classes including a page folio class 700 and a paginator class 702. Therefore, when a tiled page folio object is created by the application program Coy invoking its constructor), the constructors of the underlying base objects will also be called in order to construct, and, optionally initialize, the base objects. The base objects are thus constructed without direct participation of the application program.

The page folio class 700 is an abstract representation of documents in the printing system and can be thought of as a collection of ordered pages which, when printed, appear to the reader as being in some logical order. As will be hereinafter explained, the order in which the pages are printed is actually established by an object called a page iterator; the page folio object which is constructed from the class 700 serves simply to clump or collect the pages. A page folio object has built-in functions that can create a page iterator object, which iterator can iterate over the pages of the folio. The page folio object also includes functions which can print the pages that are part of the folio object. However, when a page folio object prints the pages that are part of the folio, the entire page set is printed. If less than the entire page set is desired, a separate page iterator object must be created and the print functions in the iterator object used to print the pages.

The filed page folio object 712 also receives various parameters from the application program which creates it. Among these parameters are a page description object 710 which collects and manages such parameters as the physical page size and the printable rectangle on the page (some printers cannot print over the entire page). Other parameters which may be provided are a page active area object (not shown), if the "active" area is less than the printable area.

The paginator base class 702, from which the filed page folio class descends, receives the page description object 710 from the subclass and uses the page description object parameters to divide a view created by the application program into collection of pages or a "paginated" view. A paginated view can represent a single page with general margins, gaps and offsets or it can represent many pages of the same size and orientation grouped together in a grid-like structure. The pages can be thought of as clipping boundaries over the extent rectangle (area of the view) or as forming sub views of a larger overall view. It is also possible that the paginator pages can have gaps between them and be offset from the extent rectangle.

As will hereinafter be described in detail, the paginator object constructor is polymorphic and, depending upon the type of parameters that are passed to the constructor during object creation, a paginator object can be constructed which can paginate the extent rectangle using a tiled model, a book model or an n-up model.

The paginator has an associated paginator iterator object, illustrated as box 704, which paginator iterator object iterates through the pages based on a "grid" model, a scan order and a grid range as will be discussed further hereinafter. More specifically, the order of page sequencing can be determined by the application program by passing a scan order specification to the tiled page folio object 712. The scan order specification is subsequently used to create a scan order object 706 which controls the order in which the pages are referenced. In addition, a page range specification can be passed to the page iterator 714 by the page range object 716. Since the page iterator object 714 is a subclass of the paginator iterator 704, the paginator iterator object is constructed when the page iterator object is constructed.

The page range object 716 is used by the page iterator object 714 to determine whether or not to print a particular page, that is, to include the page in the iteration or skip it. The page range object 716 returns basic information about a selected page "range" which is defined by the set of pages which are included in the range. A particular page in a range is designated by its page number and the pages in the range generally form a subset of the pages in the entire document. The page range object contains a number of functions which can be used to interrogate the range to determine that pages in the range. These functions include the following (the arguments have been omitted for simplicity):

IsEmpty();
IsFull();
IsPageInRange();
IsPageInRangeAndAdjustOffset();
GetPageCountInRange();
GetFirstPageInRange();
GetLastPageInRange();

The IsEmpty function returns a boolean value indicating whether or not the range is empty, that is, whether any pages of the document are in the range. Similarly, the IsFull function returns a value which indicates whether all pages in the document are in the range. These two functions provide quick checks designed to preclude having to parse through the entire range to determine whether any or all pages are included. The IsPageInRange function returns whether or not a particular page is within the range. The IsPageInRangeAndAdjustOffset function does the same thing but returns the number of pages in the range up to the particular page. The GetPageCountInRange returns the total number of pages selected by the range (which can be more or less then the number of pages in a document). GetFirstPageInRange returns the number of the first page in the range and GetLastPageInRange returns the number of the last page in the range.

Also included are a number of functions that can be used to change the selected pages in a range and to allow arbitrary selections of any set of pages in the range. These functions include the following (the arguments have been omitted for clarity):
SetRange();
Union();
Intersection();
Difference();
Xor();
Not();
SetRangeEmpty();
SetRangeFull();

The SetRange function allows the range to be set to include pages specified in another page range. For example, the range could be set to include all even or all odd pages by setting the range to another range which selects even or odd pages. The Union function combines the pages selected in two separate page ranges. Similarly, the Intersection function selects only those pages that are in both ranges. The Difference function removes or deselects specified pages. The Xor function selects pages which are the exclusive-or of both ranges. The Not function selects all currently unselected pages and the SetRangeEmpty function and the SetRangeFull function simply set the range to be empty (no pages selected) or completely full (all pages selected).

The aforementioned functions are available to the application program when the page iterator object 714 is created as will hereinafter be described by means of a "CreateIterator" function in the Tiled Page Folio object 712.

Figure 8:
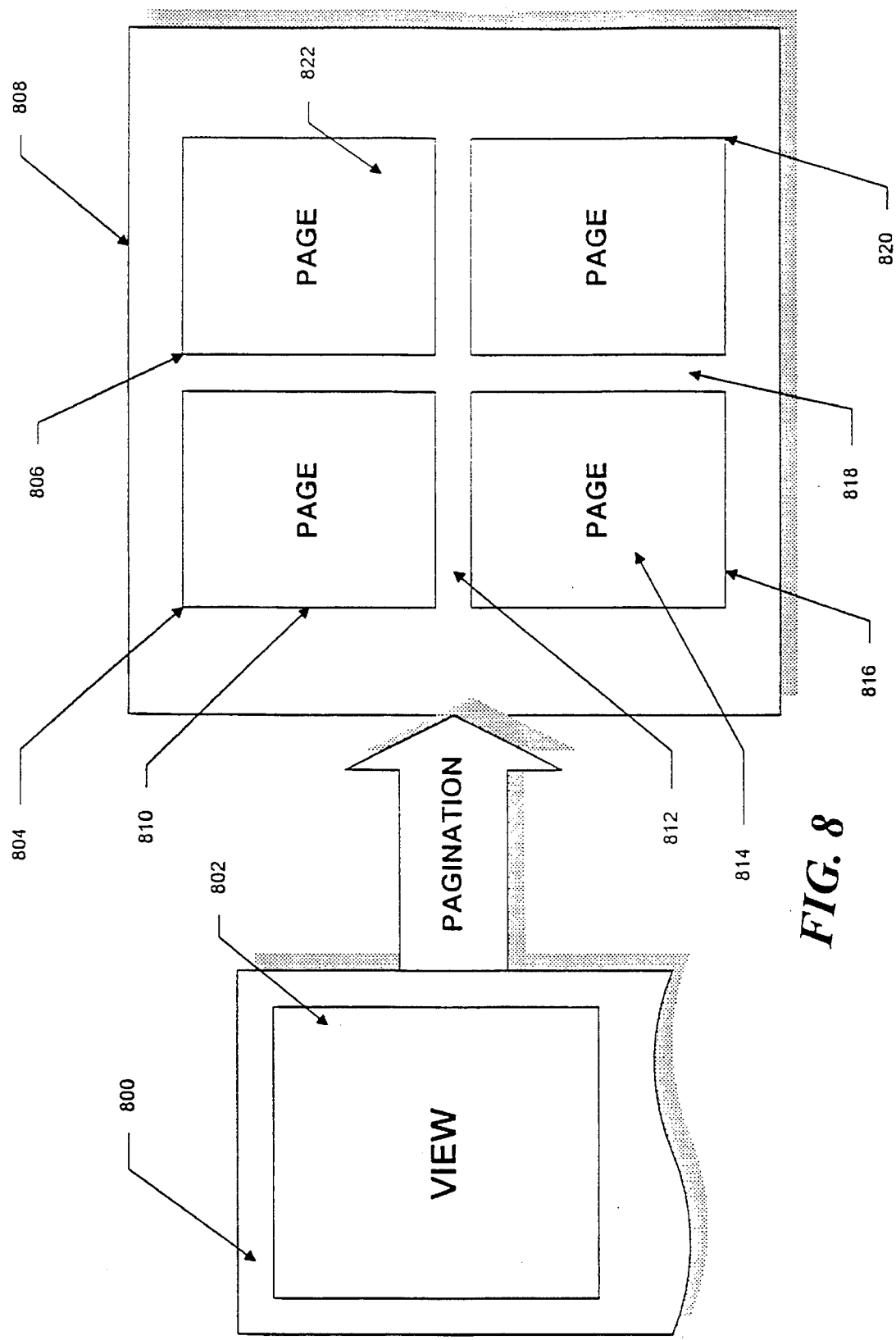
FIG. 8 is a schematic view indicating how a layout of printable information called a "view" is broken into "page-sized" pieces by the inventive pagination object.

The operation of the paginator object 702 and its accompanying paginator iterator 704 can be understood by referring to FIG. 8 which illustrates the pagination of a view into four pages. In particular, a document 800 is created by an application program, which document contains a view 802. Although the view 802 is shown as a portion of the document, it may, in fact, consist of the entire document and may include text, graphics or combination of text and graphics. The pagination process breaks the view 802 into page-sized pieces. In particular, the paginator operates with an extent rectangle 808 which may consist of the entire view or a portion of the view. The extent rectangle is specified by its extent in the x direction and its extent in the y direction. The page size, as indicated by the rectangle 814, is also specified by its x and y extents. The page size used for pagination can be the physical size of a page, the printable rectangle or some other designated rectangle. In the particular example shown, the pages are separated by vertical gaps 812 and horizontal gaps 818 which may differ in width. There are also vertical and horizontal margins 810 and 816 of arbitrary width.

For convenience, individual pages can be referenced or addressed by their location in the pagination extent rectangle that is, by the x, y coordinates of the upper left hand corner. For example, page 822 would be addressed by the x and y coordinates of its upper left corner 806. Also of importance are the x and y coordinates of the top left offset 804 which is used in the pagination process and the coordinates of the bottom right offset 820.

Figure 9:
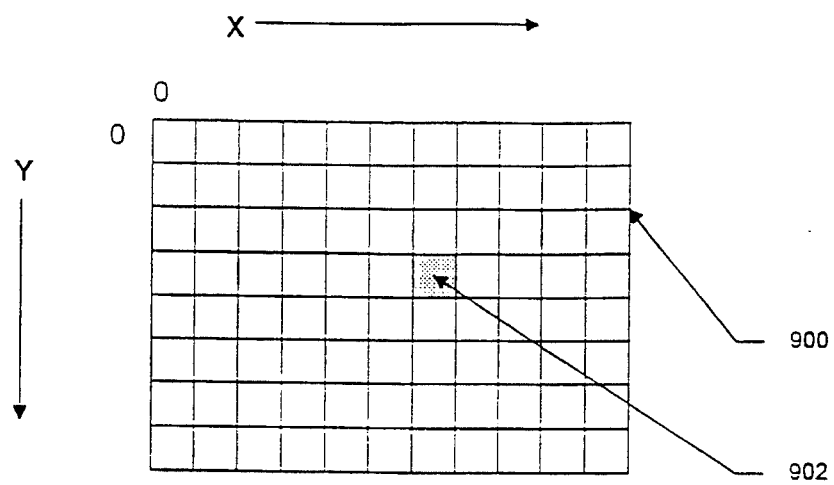
FIG. 9 is a schematic illustration of a grid system that can be superimposed over a view to facilitate scan order sequencing.

A basic component of a paginator iterator object is a two dimensional grid, such as grid 900 schematically illustrated in FIG. 9. In order to paginate a view such a grid is super-imposed over the view and each of the grid cells, or grid components, corresponds to a page. For identification purposes, each cell has a coordinate address that mark its location in the grid. In illustrative paginator iterator object, the associated grid has both x and y coordinate addresses with the coordinate address (0,0) corresponding to the grid cell in the top left hand corner. As illustrated in FIG. 9, the x coordinate starts at zero in the upper left hand corner and increases to the right and the y coordinate starts a 0 in the upper left hand corner and increases in the downward direction. Thus, an arbitrary grid cell, such as cell 902, has a grid coordinate address of (6, 3). In addition, the grid has an overall size determined by the total number of cells in the x direction and the total number of cells in the y direction; thus the grid shown in FIG. 9 would have a grid size of (11, 8) indicating that there are 11 cells in the x direction and 8 cells in the y direction.

Figure 10:
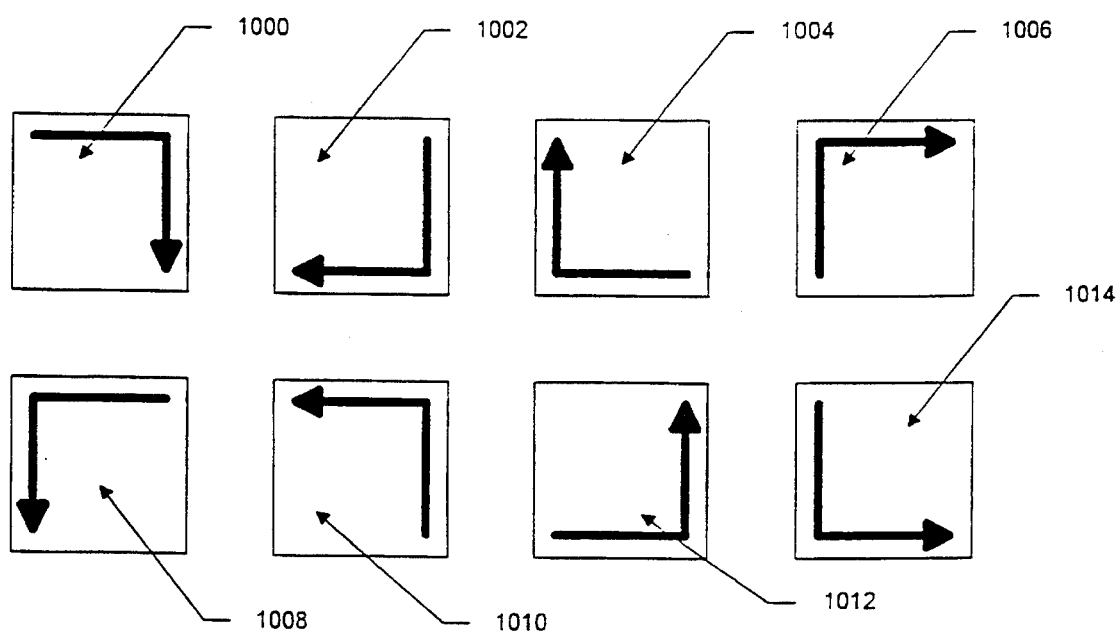
FIG. 10 is a collection of pages illustrating eight sample "raster" scan orderings.

Grid cells can also be numbered sequentially and, in keeping with the coordinate notation, are numbered from 0 to n-1 where n is the total number of cells and is given by the x grid size times the y grid size. However, the component number assigned to each cell in the grid depends on the order in which the numbers are assigned and the position at which the numbering begins. There are many ways in which the cells can ordered in sequence. For example, it is possible to start from the upper left hand corner of the grid and number the cells in sequence along the x direction until the upper right hand corner is reached. Then, move down one row and start at the left hand side of the grid and number along the x direction until the right hand side is reached again, moving down row by row from top to bottom. This choice of ordering is called a "raster" order because it resembles the order in which an image is drawn on a television or display screen. This order scheme is shown schematically in FIG. 10, box 1000, and is arbitrarily called "right down" raster ordering, because the ordering first proceeds to the right and then down. It is, of course, also possible to start at different positions and proceed in different directions to achieve a number of other raster orderings. Combining all possible combinations provides a total of 8 different orderings as shown in FIG. 10. These orderings are named in Table 1 according to the convention used with box 1000.

TABLE 1

| BOX NUMBER | NAME |
|---|---|
| 1000 | right down |

TABLE 1-continued

| BOX NUMBER | NAME |
|---|---|
| 1002 | down left |
| 1004 | left up |
| 1006 | up right |
| 1008 | left down |
| 1010 | up left |
| 1012 | right up |
| 1014 | down right |

It is also possible to order the grid cells in other orders such as random order, zigzag order, rotating order, spiral order, and checkerboard order to name a few possibilities. However, in order to simplify the discussion, the eight orderings listed above will be used for the remainder of the discussion.

The grid range object 708 contains a two dimensional set of items which can be used to represent any collection of items that can be numbered and arranged in a grid pattern. This is a familiar concept used with bitmap images and regions which can be defined in certain drawing program such as the QuickDraw (Apple %o) drawing program. As with the page range object 716, previously described, the grid range object 708 includes various functions which interrogate the grid range and return information about the contained items. For example, these functions may include (arguments omitted for clarity):
Contains();
IsEmpty();
IsFull();
GetItemCountInRange();
GetBounds();

The Contains function returns a true value if a specified item's grid coordinate is within the grid range. The IsEmpty function returns a true value if the range is empty or has no items specified. Similarly, the IsFull function returns a true value if at least one item is contained in the range. The GetItemCountInRange and GetBounds functions compute and return the total number of items within the range.

There are also functions included which change the range structure such as the following:
SetRange ();
SetRangeEmpty();
SetRangeFull();
Union();
Intersection();
Difference();
Xor();
Not();

The SetRange function can be used to arbitrarily set the grid range to a rectangular area encompassing a "from" point inclusive to a "to" point exclusive. In other words the selected region is half open [from, to). The "from" point included in the region while the "to" point is not. Although the "from" and "to" points can specify any two opposing corners of the rectangular area, the enclosed area is always half open from the upper-left hand corner to the lower-right hand corner. Consequently, all of the following range specifications are equivalent:

| "from" | "to" |
|---|---|
| (0,0) | (1,1) |
| (1,1) | (0,0) |
| (0,1) | (1,0) |

| "from" | "to" |
|---|---|
| (1,0) | (0,1) | and all of the above ranges enclose the element (0,0). The purpose for specifying the ranges in this manner is so that empty regions can be quickly identified by using statements such as "from=to". This manner of specifying ranges is used in the aforementioned functions and is used by the paginator iterator object to select pages for pagination.

With the concepts of a grid, cell ordering and grid ranges, the operation of the paginator object can be explained in detail. As previously mentioned, the paginator object is constructed as a base class of the tiled page folio object and the type of paginator object which is created is determined by the variables passed from the tiled page folio object to the paginator object constructor. When constructed, the paginator object includes a number of internal, or private, variables, including, the grid size, the size of the extent rectangle, the page size, the top left offset coordinates, the bottom right offset coordinates, the vertical and horizontal gap sizes and two Boolean variables one of which can be used to indicate whether the pagination consists entirely of whole pages or whether partial pages can appear at the right and bottom boundaries. The second Boolean variable indicates whether the extent rectangle is to be considered as fixed.

The formula that is used to calculate the number of pages in the extent rectangle and the gap and offset settings must satisfy the fundamental relationship:

$$Extent = top\ left\ offset + bottom\ right\ offset + n * (page\ size + gap) - gap$$

where n represents a pair of numbers indicating the number of pages contained in the extent area in the x and y directions and is greater than or equal to (1, 1). It should be understood that the above formula is actually a two-dimensional vector formula and that each of the variables actually consists of a two-tuple or two numbers. For example, the extent actually consists of two numbers indicating the x extent and the y extent. Similarly, the top left offset is a two-number variable indicating the x and y coordinate values of the upper left hand corner of the extent rectangle.

Figure 11:
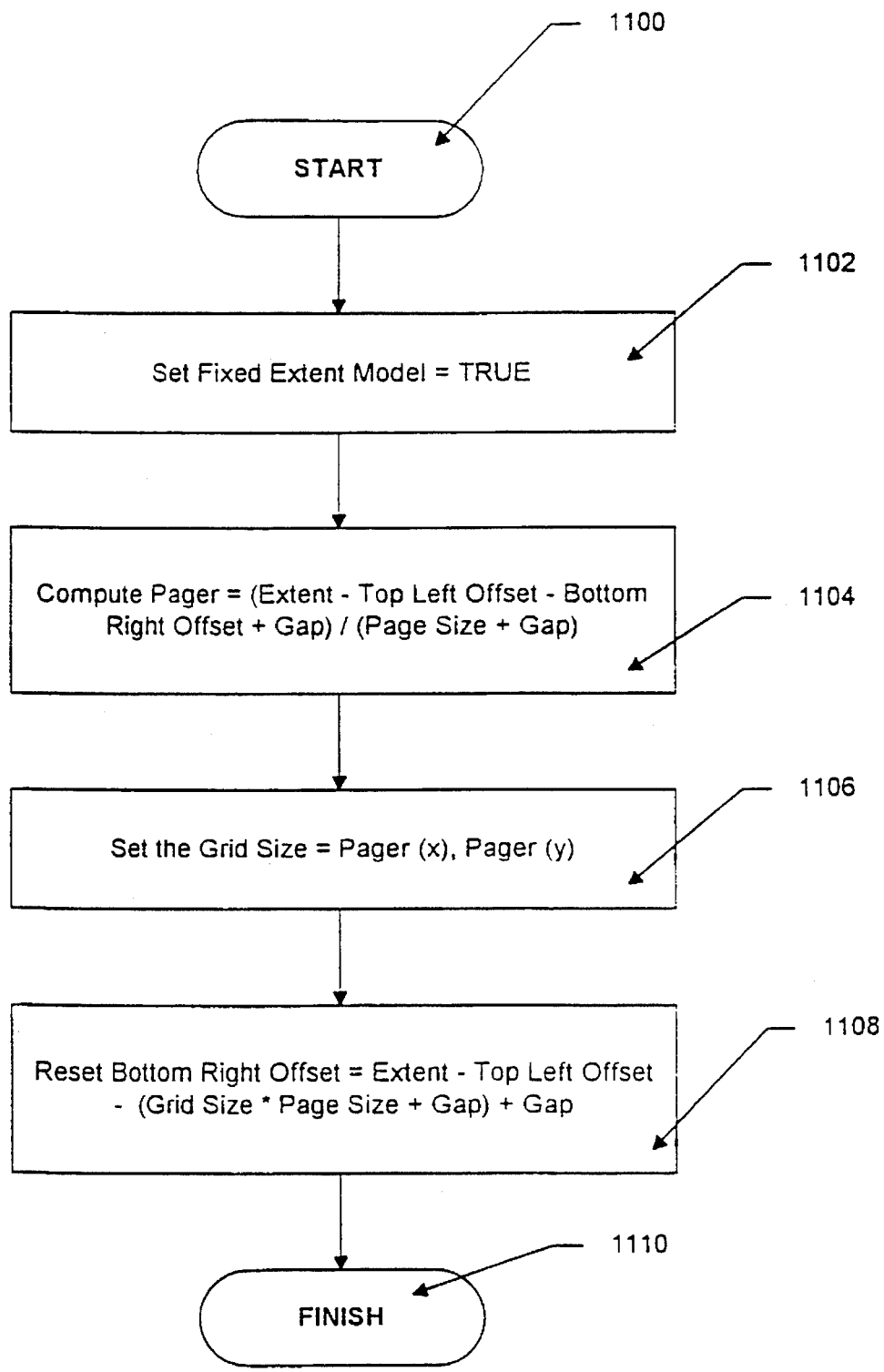
FIG. 11 is an illustrative flowchart of a method by which a view is paginated into page size pieces in accordance with one pagination model used by the paginator object.

There are three types of pagination models used in the illustrative paginator object; the first model (used by the tiled page folio object) uses a fixed extent rectangle which remains fixed despite changes or variations in page size. This model is arbitrarily called the "MacDraw" model and requires that the paginator receive from the tiled page folio object, the page size, the extent, the top left offset, the bottom right offset and the gap parameters. The paginator then calculates the page frequency or the number of pages in both the x and y directions (equivalent to grid size). In the illustrative routine which is used by the paginator to calculate page frequency or equivalently the grid size is shown in FIG. 11. This routine starts in step 1100 and proceeds to step 1102 in which the variable indicating that the extent is fixed is set to TRUE. Next, in step 1104 an intermediate "pager" variable is calculated according to the formula.

$$Pager = (extent - top\ left\ offset - bottom\ right\ offset + gap)/(page\ size + gap).$$

After the pager variable has been computed, the x and y components of the grid size are set to the x and y components of the pager variable as shown in step 1106. Finally, the bottom right offset is reset. In this model, the bottom right offset is treated more as a guideline than an absolute parameter and absorbs the "slack" when the extent rectangle is modified. The bottom right offset is recomputed according to the formula:

$$\text{Bottom right offset} = \text{extent} - \text{top left offset} - (\text{grid size} * (\text{page size} + \text{gap})) + \text{gap}$$

As shown in step 1108, the routine then proceeds to the finish illustrated in step 1110.

The remaining two models used by the paginator object form the basis for pagination in the other page folio objects. For example, another pagination model is a flexible model with an overall extent rectangle size that can adjust to page size variations; extra pages or rows of pages can be added to this model to increase the overall extent rectangle. This latter model is arbitrarily referred to as the "MacWrite" model and is similar to the output produced by a conventional word processor. A third model is a variable n-up page model where a sub page size is calculated based on the page frequency and the overall extent rectangle size. Several sub pages are then arranged on each full page. While these latter two models are not used in the tiled page folio object now under discussion, they are included here for sake of completeness of the paginator model.

Figure 12:
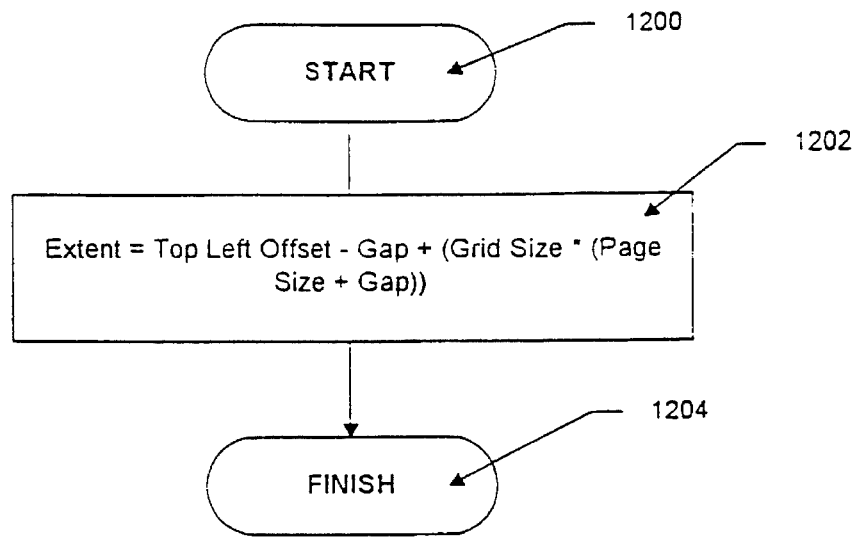
FIG. 12 is an illustrative flowchart of a method by which a view is paginated into page size pieces in accordance with a second pagination model used by the paginator object.
Figure 13:
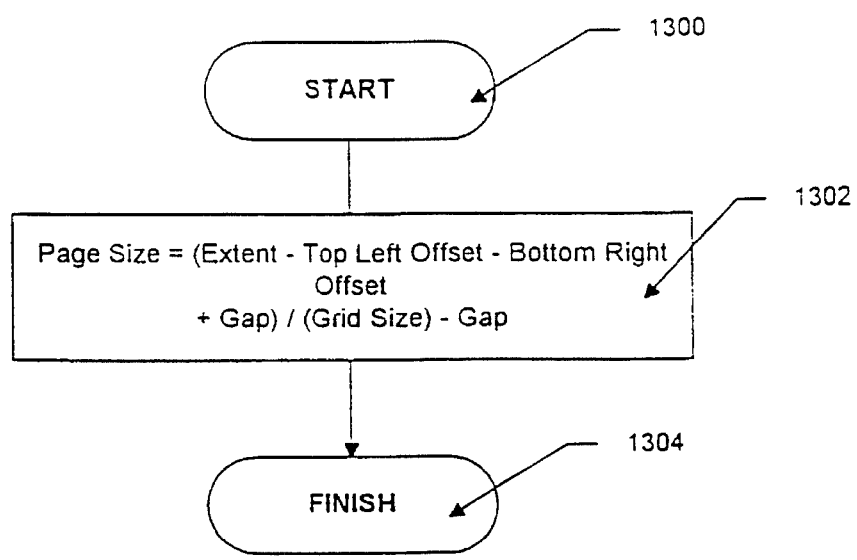
FIG. 13 is an illustrative flowchart of a method by which a view is paginated into page size pieces in accordance with a third pagination model used by the paginator object.

The computation of the latter pagination models are shown in FIGS. 12 and 13. Referring to FIG. 12, computations involved in the fixed array or "MacWrite" model are shown. In this model, the paginator receives the number of pages as determined by the page frequency, the page size, the top left offset, the bottom right offset and the gap from the corresponding page folio object and the extent rectangle is calculated. The routine used in the calculation starts in step 1200 and proceeds to the calculation step 1202 using the formula:

$$\textit{Extent=top left offset–gap+(grid size * (page size+gap))}$$

The routine finishes in step 1204.

The remaining paginator routine using the n-up page model requires that paginator receive the extent rectangle size, the page frequency, the top left offset, the bottom right offset and the gap from the associated page folio object and the page size is calculated. This routine is shown in FIG. 13 and starts as step 1300. The calculation is performed in step 1302 and uses the formula:

$$\textit{Page size=(extent–top left offset–bottom right offset+ gap)/(grid size)–gap}$$

where the grid size comprises the two digit number indicating the number of grid cells in the x direction and the number of cells in the y direction. The routine then proceeds to step 1304 to finish.

Figure 14A:
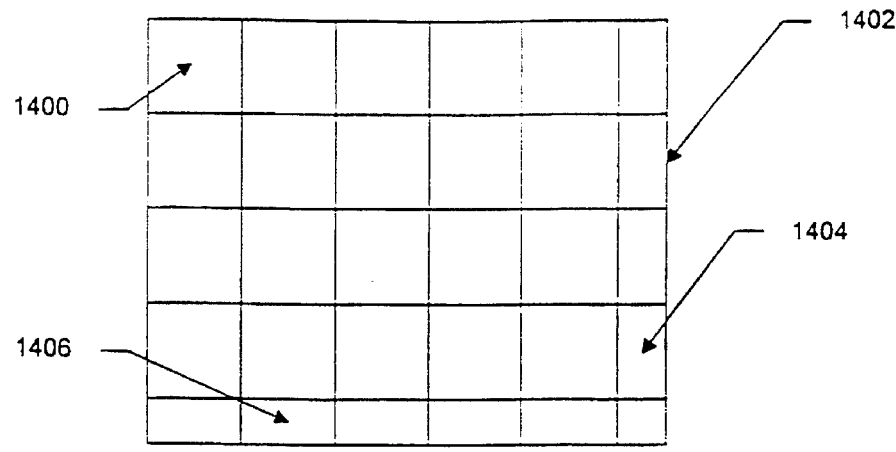
FIGS. 14A–14C are schematic diagrams of pages produced in accordance with each of the three paginator models used by the illustrative paginator object.
Figure 14B:
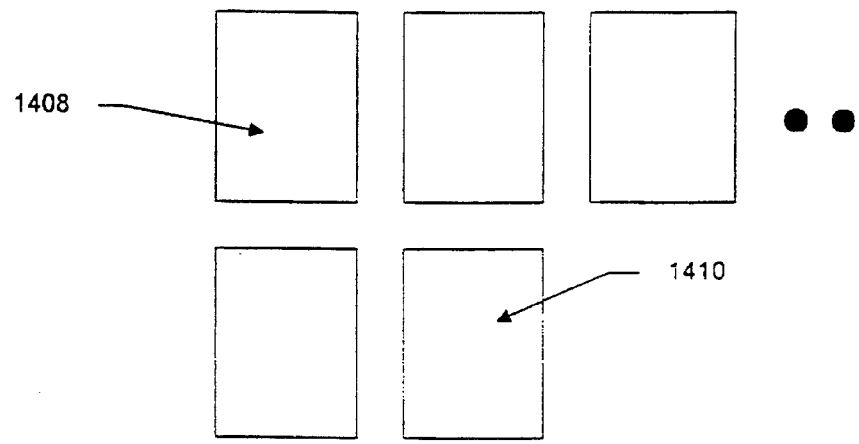
Figure 14C:
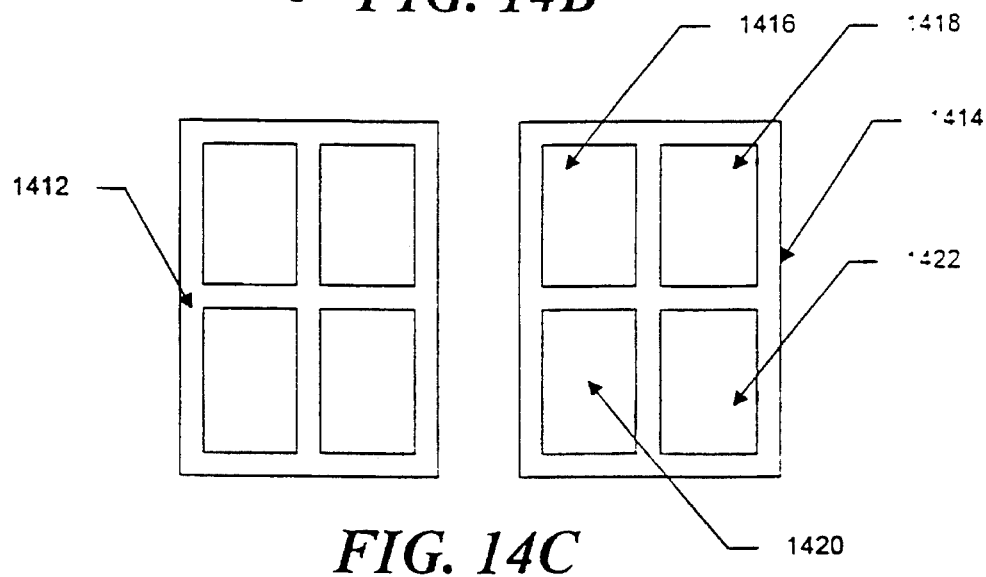

The difference in the output produced by the various pagination routines is shown in FIGS. 14A–14C. FIG. 14A shows the pagination performed by the "MacDraw" model which breaks the fixed-size extent rectangle 1402 into uniformly tiled page-sized pieces 1400. Partial pages are possible at the right hand margin, 1404, and the bottom margin, 1406, and there are usually no gaps between pages.

Alternatively, the output of the MacWrite paginator model is shown in FIG. 14B. This is similar to the MacDraw paginator except that the paginated pages, 1408 and 1410, are usually whole pages with horizontal and vertical gaps between each page. New rows or columns of pages can be easily added to extend the array in either the x or y directions.

The output of the n-up pagination model is shown in FIG. 14C. The model shown is a 4-up model although the pagination can be arbitrarily extended to any multiple. In this case, each page of the model consists of four sub pages arranged in order on the page, any number of sub pages of course, can be included on each page produced by the paginator.

The paginator iterator 704 sequences through the pages in an order generated internally or supplied by the application program via the page iterator 714. Pages in a paginated view are numbered according to their location in the view using the grid properties discussed above. Unless set otherwise by the application program or in the paginator itself, page numbers by default are numbered in sequence in "right down" raster order (box 1000, FIG. 10). The page numbers that are internally assigned are cardinal numbers beginning at zero and do not necessarily represent either of the page numbers assigned by the application program or the actual printing order produced by a particular iteration, they are merely internal labels used to refer to the pages.

In addition to internal page numbering, individual pages may be addressed by their location in the paginator extent rectangle, that is, the coordinate location of the upper left hand corner of each page. The application program has the option of referring to any individual page by its grid coordinates, its location in the paginator grid, its page coordinates, its view coordinates or by its internal page number. Page coordinates depend on the margin and gap settings specified by the application program whereas page numbers and grid coordinates do not.

The function of the paginator iterator 704 is to parse through the pages of the paginator based on either a default scan order or a scan order supplied by the application program and an optional selection range for that paginator. The iteration process actually begins when the page iterator 714 is created by the application program, which is accomplished by invoking a function in the tiled page folio object called "CreateIterator". Since the page iterator 714 is a subclass of the paginator iterator 704, the paginator iterator is also created at the same time that the page iterator is created.

Scan order is handled by defining separate classes for each of the eight scan orders shown in FIG. 10 and creating a scan order object from one of these classes during iteration depending as selected by the application program. These eight scan order classes are assigned names corresponding to the names listed in Table 1 for each scan order. Each scan order is also assigned an arbitrary number ranging from 0–7 and, when a paginator iterator 704 is constructed, it contains a variable indicating the selected scan order. This variable is initialized to 0, resulting in the creation of a scan order object which operates to order the scan in the "right down" order.

The application program can change the scan order by utilizing an AdoptScanOrder function which is built-in the page iterator 714. In response to the AdoptScanOrder function, page iterator 714 forwards a request to change the scan order to the paginator iterator 704 by invoking an "AdoptScanOrder" function in the paginator iterator. This latter function causes the scan order variable in the paginator iterator to be set to a new scan order. In response a new scan order object is created.

Each scan order object contains several functions which scan over the grid cells. One of the most important functions in a scan order object is the SeekNext function, which receives the grid coordinates of the current page and returns the grid coordinates of the next page in the selected scan order. The SeekNext routine is of course, different for each scan order object in order to cause each object to behave differently. Another important function determines the grid bounds in the x and y directions using the grid size calculated by the paginator object from the parameters passed from the application program.

Figure 15:
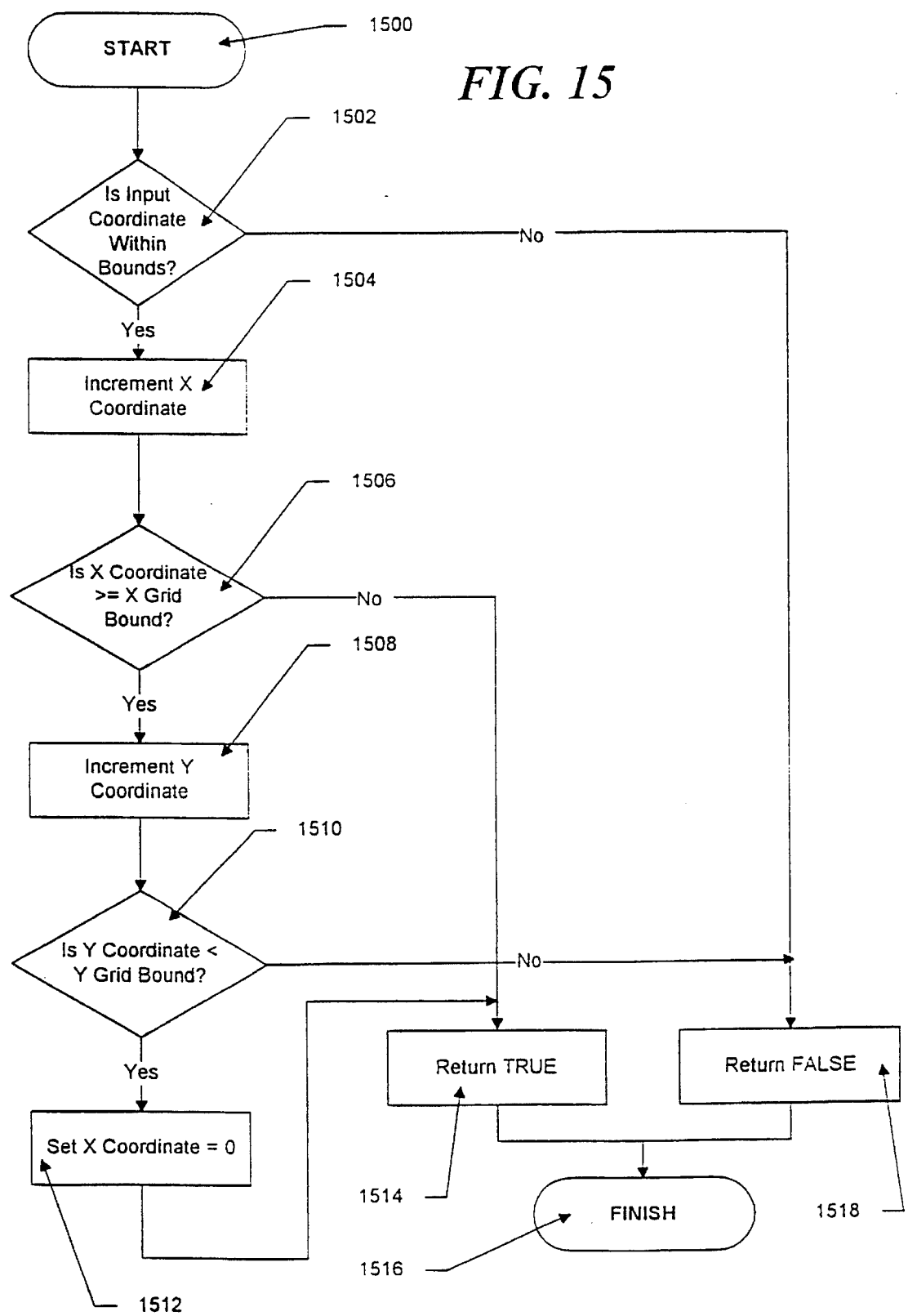
FIG. 15 is an illustrative flowchart of a method for seeking the next page in an illustrative scan order denoted as the "right down" scan order.

An illustrative SeekNext function for a "right down" scan order object (the default order) is shown in FIG. 15. The function receives an initial input coordinate indicating the current page grid coordinates. It resets the coordinate values to the grid coordinates of the next page and returns a value of TRUE or FALSE indicating whether the next page in the scan order is within the selected page range or not. As will hereinafter be explained, the return values are used to determine whether the end of the printing range has been reached during the printing process.

More particularly, the SeekNext routine starts in step 1500 and proceeds to a decision step 1502 in which the input grid coordinates are checked to determine whether the selected cell is within the grid bounds. As mentioned above, the grid bounds are determined by the page frequency or grid size calculated by the paginator object. If the selected cell is not within grid bounds, an error condition is indicated and a FALSE value is returned in step 1518 and the routine finishes in step 1516. Alternatively, if the input coordinate is within grid bounds, the routine proceeds to step 1504 in which the x grid coordinate is incremented, causing the selected grid cell to move one space to the right.

In decision step 1506, the new x coordinate is checked to make sure it is not at or over the x grid bound. If it is not, the coordinates of the next page in the scan order have been found and the routine returns a TRUE value in step 1514 and finishes in step 1516.

Alternatively, if the new x coordinate lies at the x grid bound, the scan order must return to the beginning of the next lower row. Accordingly, the y coordinate is incremented in step 1508 causing the selected cell to move down to the next row. The new y coordinate is checked in step 1510 to make sure that it is less than the Y grid bound. If it is, the x coordinate is set to 0 indicating that the scan order has started on a new row and, in step 1512. A return value of TRUE is returned in step 1514 and the routine ends in step 1516.

Alternatively, if the new y coordinate is outside of the y grid bound then the end of the grid range has been reached and a FALSE value is returned in step 1518 and the routine finishes in step 1516.

Figure 16:
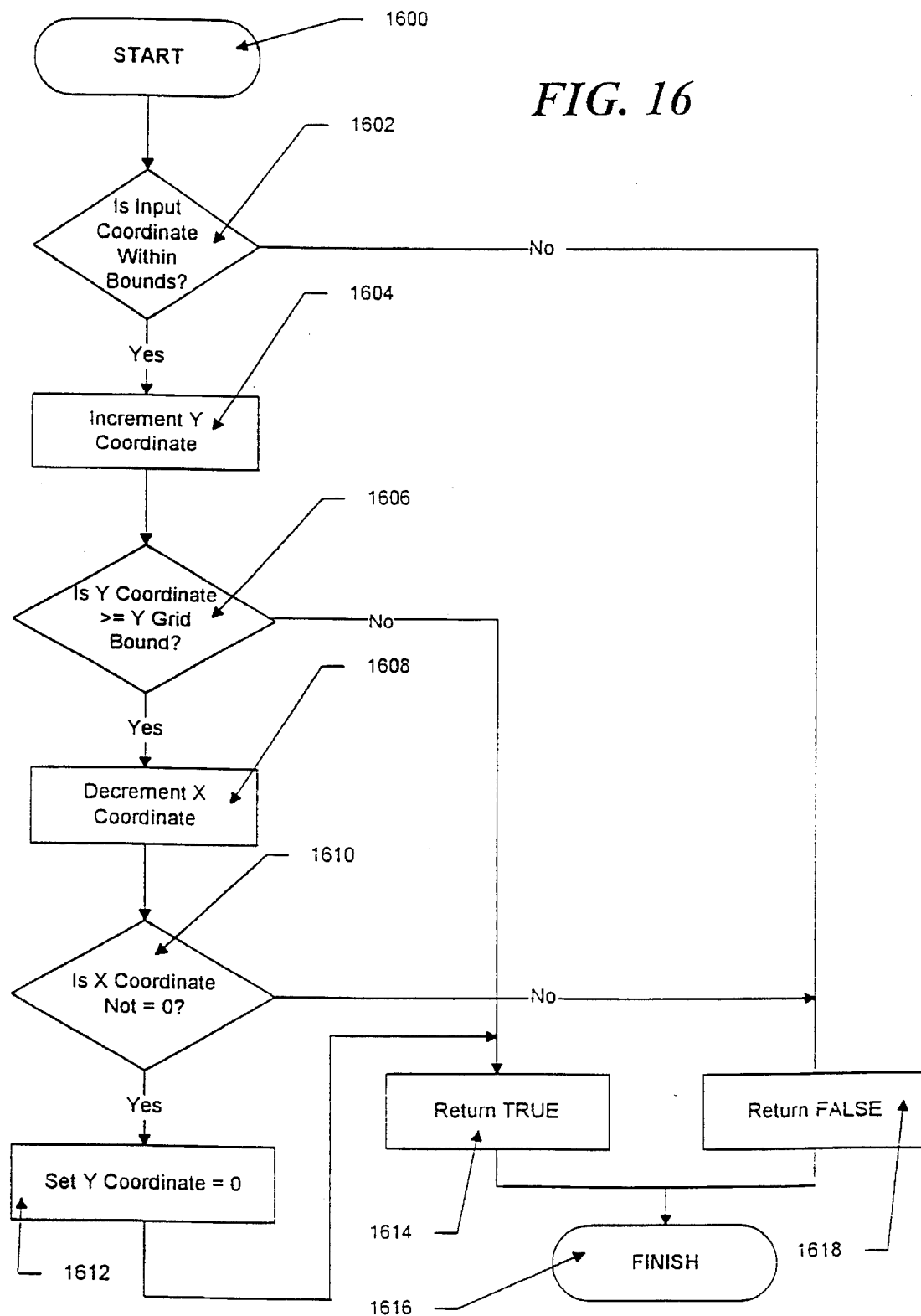
FIG. 16 is an illustrative flowchart of a method for seeking the next page in an illustrative scan order denoted as the "left up" scan order.

As previously mentioned the illustrated SeekNext routine is only valid for the "right down" scan order object and the routine will be different for each scan order object. Another illustrative routine for the "down left" scan order object (corresponding to box 1002 in FIG. 10) is shown in FIG. 16. The scan order routine in FIG. 16 is quite similar to that shown in FIG. 15 for the right down configuration except that the order of incrementing the x and y coordinates is different. In particular, the down left routine starts in step 1600 and proceeds to decision step 1602 in which the input coordinate is checked to see whether it is within the grid bounds. If it is not, a FALSE value is returned in step 1618 in the routine finishes in step 1616.

Alternatively, if the input coordinate is within bounds the y coordinate is incremented in 1604, thereby effectively dropping down one row. In step 1606, the y coordinate is checked against the y grid bound to determine whether the y coordinate has exceeded the grid bound. If it has not then the next page in the scan order has been determined and the routine proceeds to step 1614 where it returns a TRUE value and finishes in step 1616.

Alternatively, if the y coordinate has reached or exceeded the y grid bound, then the x coordinate is decremented in step 1608 moving the selected page one position to the left in the scan order. In step 1610, the new x coordinate is checked to make sure it is not zero. If the new x coordinate has reached zero then the end of the scan order has been reached and a FALSE value is returned in step 1618 and the routine finishes in step 1616.

Alternatively, if the x coordinate is not zero, then the y coordinate is set to zero in step 1612 and a TRUE value is returned in step 1614 with the routine finishing in step 1616.

In a similar manner to the two scan order objects previously described, each of the other scan order objects includes a SeekNext routine, these are designed in a similar manner to the SeekNext routines shown in FIGS. 15 and 16 and for clarity the details of these routines is omitted.

The SeekNext routines found in the scan order objects are used by two routines found in the page iterator which enable the page iterator to select the first page in the selected page range and the scan order and then to step through the selected pages during a printing operation. These latter two routines are a denoted as the SeekFirstPageInRange routine and the SeekNextPageInRange routine. The SeekFirstPageInRange routine is illustrated in detail in FIG. 17.

The routine starts in step 1700 and proceeds to step 1702 in which the grid range is checked for validity, if the grid range is not valid, the first grid cell in the range is obtained in the step 1704 and the routine finishes in step 1718. Alternatively, if the grid range is valid a "guess" rectangle is created in step 1706 using a standard rectangle creation routine. The creation of the "guess" rectangle is used to increase the performance of the program and is illustrative only—other routines which perform the same overall task will become immediately apparent to those skilled in the art. The routine then proceeds to step 1708 in which the guess rectangle size is set to the grid boundaries. This gives an initial rectangle which spans the entire grid.

In step 1710, the grid cell with the smallest page number that encloses one corner of the guess rectangle is determined. This step is performed because, depending on which scan order is selected, the starting position will vary. Once the grid cell with the minimum page number is located, the grid cell page number is converted to a current coordinate in step 1712.

In step 1714, the new current coordinate is checked to see if it is within the selected grid range; if it is not, the routine is finished in step 1718. Alternatively, if the new current coordinate is within the selected grid range, the next item in grid order is obtained in step 1716 by utilizing a SeekNext routine corresponding to the selected scan order such as those illustrated in FIGS. 15 and 16.

After the next item has been obtained it is then compared against the current grid range to see whether it is within the grid range, the routine finishes when the next item falls outside the current grid range indicating the end of the grid range has been reached.

Figure 18:
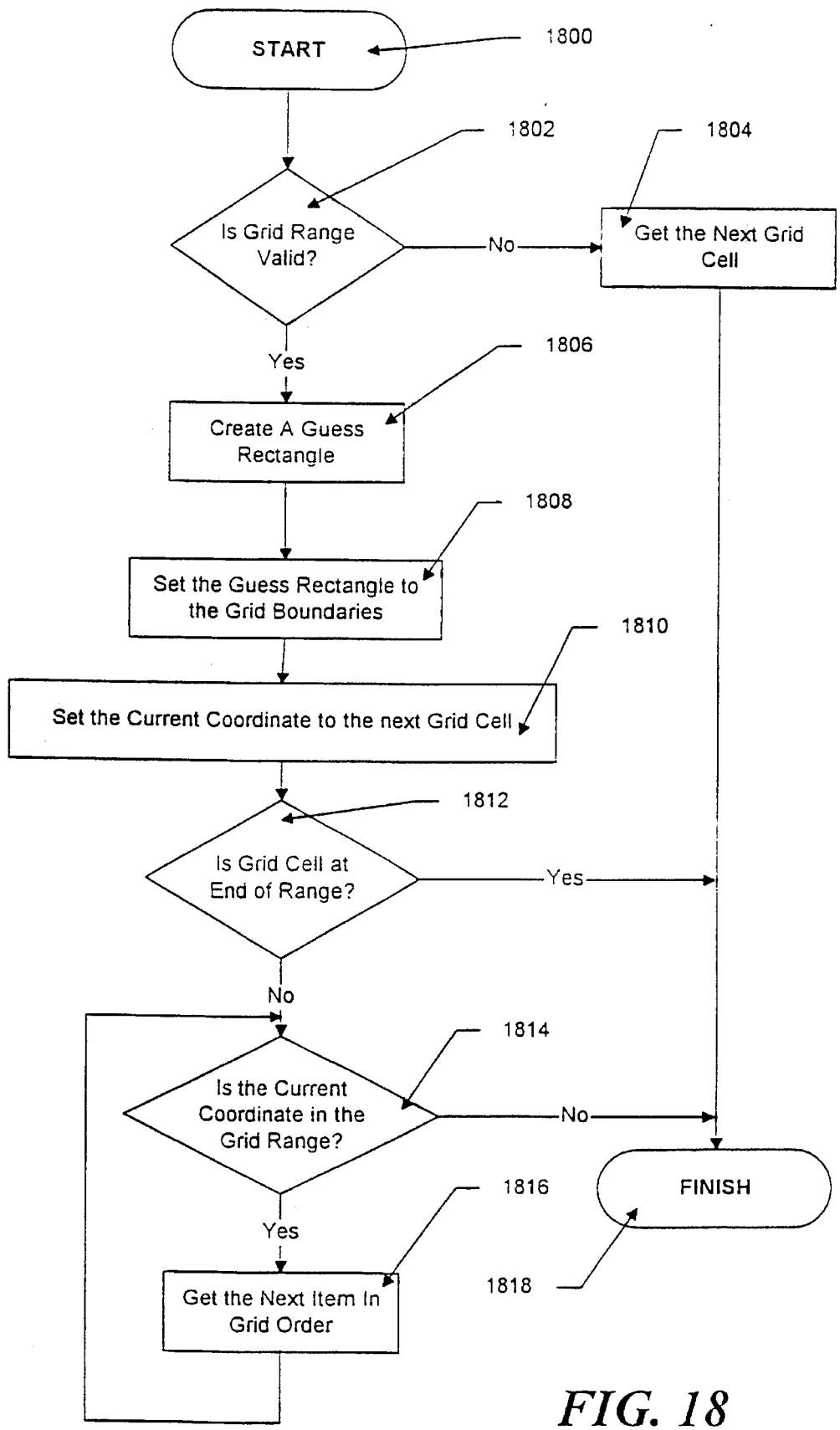
FIG. 18 is an illustrative flowchart of a printing routine used by a page iterator to select the next page in a preselected scan order for printing.

The SeekNextPageInRange routine is shown in FIG. 18; the routine starts in step 1800 and proceeds to step 1802 where the grid range is checked for validity. If the grid range is not valid the next grid cell in the scan order is selected in step 1804 and the routine finishes in step 1818.

Alternatively, if the grid range is valid, a "guess" rectangle is created in step 1806 and set to the grid boundaries in step 1808. In step 1810, the current coordinates of the guess rectangle are set to the next grid cell coordinate and the routine then proceeds to step 1812 where the new grid cell is checked to see whether it exceeds the end of the range. If the new grid cell is outside the selected range, the routine ends in step 1818, if not, the current coordinate is checked to see whether it is within the current grid range in step 1814.

If the current coordinate lies outside the current grid range the entire range has been traversed and the routine ends step 1818. Assuming that the current coordinate is within the current grid range, the next item in grid order is obtained in step 1816 using a SeekNext routine such as those illustrated in FIGS. 15 and 16 depending on the scan order selected by the application program.

The SeekNextPageInRange routine operation continues between steps 1814 and 1816 until the current coordinate of the item falls outside the current grid range, at which point the routine finishes in step 1818.

Both the SeekFirstPageInRange function and the SeekNextPageInRange functions are used during the page iterator print routine which actually performs the printing of the pages. This latter routine is shown in detail in FIG. 19 and starts in step 1900. A check is made in step 1902 to ensure that the page count is not equal to zero. If the page count is equal to zero processing stops and proceeds to step 1924.

Assuming that the page count is not equal to zero, the routine proceeds to step 1904 in which a variety of variables including the area, offset, location, view and page description are created and loaded from information provided from the application program.

Figure 17:
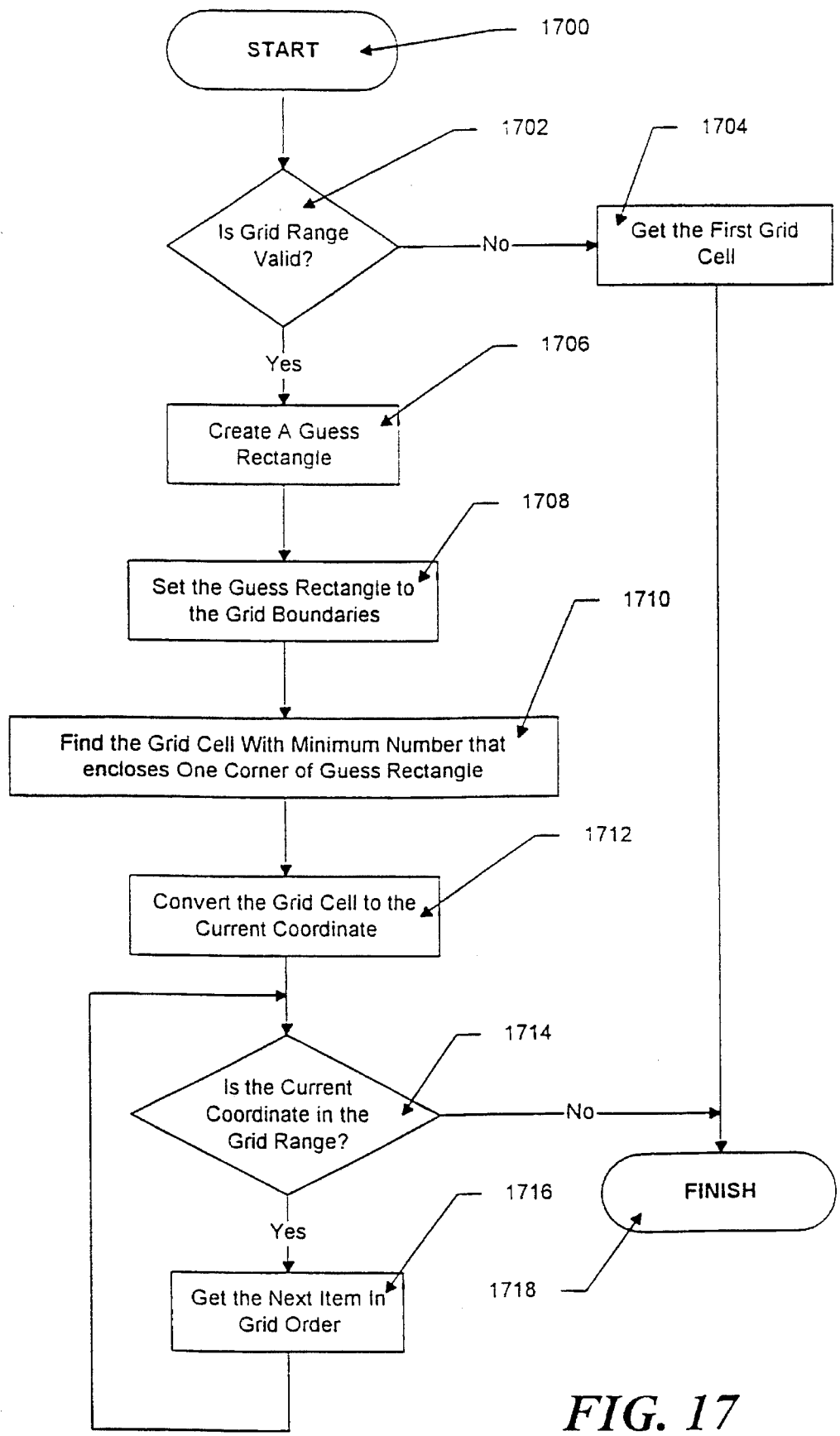
FIG. 17 is an illustrative flowchart of a printing routine used by a page iterator to select the first page in a preselected scan order for printing.

The routine then proceeds to step 1906 where a SeekFirstPageInRange function from the page iterator is called, which function has been previously described in detail in connection with FIG. 17. A check is then made in step 1908 to ensure that the immediately preceding seek was valid. In particular, as previously mentioned, the SeekFirstPageInRange routine returns a TRUE value if the seek actually returns page coordinates within a valid page range. The SeekFirstPageInRange routine returns a FALSE value to indicate that the returned page coordinates lie outside the valid page range and that the results of the previous seek are, therefore, indeterminate. In this latter case, the routine proceeds to the finish in step 1924.

Alternatively, if the results of the previous seek indicate that valid page coordinates have been obtained then, in step 1910, coordinates of the view are obtained. These coordinates are provided by the application program and are referenced at this stage to ensure that the proper view is obtained for each page. In accordance with the principles of the invention, different views can be used for each page so that the proper view must be obtained before printing each page.

The routine then proceeds to step 1912 to check whether the view obtained in step 1910 is valid, if not, the routine ends in step 1924 (the steps necessary to check for a valid view are encapsulated in an object which deals with views. This object does not form part of the present invention and will not be discussed in detail hereinafter). If the view is valid, the routine proceeds to step 1914 where the page coordinate is obtained from the SeekFirstPageInRange routine. The routine then proceeds to step 1916 in which the page description and active area are obtained from values provided by the application program (as with page view these variables may change from page to page and must be acquired before each page is printed).

Using the page coordinates, the page description and the active area values obtained in step 1918, the selected page is translated to a new page coordinate corresponding to its new location in the output page. This translation is performed using straightforward translation routines. In step 1920, the page is printed (queued to the print channel which spools it) and, in step 1922, the next page in the page range is obtained with a SeekNextPageInRange routine which is shown in detail in FIG. 18.

The printing routine then proceeds to step 1908 to check whether the previous seek operation was valid. If so, pages are then obtained and printed in scan order until the result of the seek OK decision in step 1908 indicates that the end of the range has been reached. At this point, a FALSE return is detected by the Seek OK step 1908 which then causes the routine to exit at the finish step 1924.

In addition to the page coordinates, all of the Seek functions of the page iterator objects return a printable page object which can be used to draw the page whose coordinates were just returned by the previous Seek function. The printable page object is just a simple and convenient way to represent a page that is intended for printing (or display on the terminal screen). The printable page object contains a number of functions which can retrieve information about the page and draw it. These functions include:
GetPageNumber();
GetPageDescription();
GetPageActiveArea();
Draw();

The GetPageNumber function returns the page number of the currently selected page, the GetPageDescription function returns the expected page description for the page, and the GetPageActiveArea function returns an active printable area within the page as selected by the application program. The Draw function allows the page to be drawn on any grafport, a printer or display. One implementation of the Draw function might consist of creating a "page matrix" in, for example, a grafport; translating the page to the correct area in the page matrix; linking the translated page to a port; clipping the page and drawing the clipped page on the port as represented by the following C++ statements (where fPageIterator is the page iterator creating the printable page object):

```
void Draw(const TGrafPort& port) const {
    TGrafMatrix pageMatrix;
    pageMatrix.TranslateBy(fPageIterator-
>GetPageAreaAs( ));
    TSimpleCoordinateSystem pageSystem(pageMatrix);
    TLinkedViewCoordinatePort pagePort(port,
&pageSystem);
    TSimpleClipBoundary pageClip(fPageIterator-
>GetPageAreaAs( ));
    TLinkedClipPort pageClipPort(pagePort,&pageClip);
    fPageIterator->GetPageView( )-
>Draw(pageClipPort);
}
```

BOOK PAGE FOLIO OBJECT

The operation of the book page folio is essentially equivalent to the tiled page folio object with the only significant difference occurring when the book page folio object is created. As previously mentioned, the paginator is polymorphic and can performs several different pagination functions depending on the variables provided to the constructor when the paginator object is constructed. In particular, during the construction of the book page folio object, the top left offset, gap, grid size (number of pages) and page size is provided by the book page folio object to the paginator constructor. This parameter selection causes the paginator constructor to construct a paginator object which operates according to the flowchart shown in FIG. 12 to calculate the extent required so that the paginator operates under the "MacWrite" model.

With the aforementioned change, the operation of the book page folio object is essentially equivalent to that of the tiled page folio object.

COMPOUND PAGE FOLIO OBJECT

The compound page folio object is an object which represents collections of other page folio types. Its basic structure is equivalent to a double-ended queue (deque) and other page folios can be added to the queue and removed from the queue in a straightforward manner.

Figure 20:
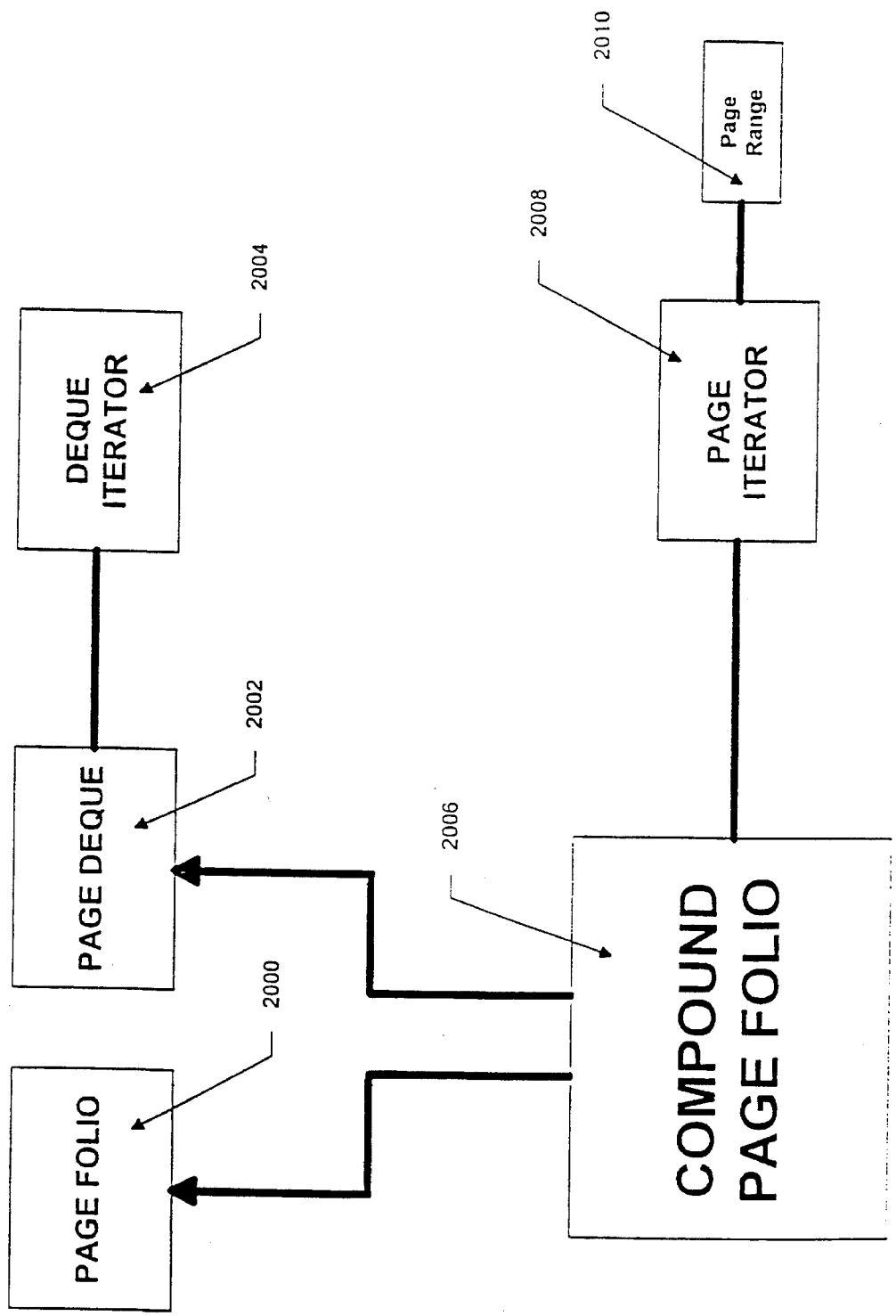
FIG. 20 is a simplified class hierarchy diagram illustrating the base, subclasses and associated classes involved in the construction of a compound page folio object.

The inheritance diagram for the compound page folio object is shown in FIG. 20 which indicates that the compound page folio object 2006 descends from both a page folio object 2000 and a page deque object 2002. The deque object 2002 has its own deque iterator 2004 which is created at the time the deque object is created by the deque object constructor.

The double-ended page deque is a standard storage object which is well-known in the art. Generally, the deque is manipulated by a variety of functions which allow items to be added either at the beginning of the queue, the end of the queue or at some specified point within the queue. Additional routines are provided to delete some or all of the items in the deque. Since the routines for manipulating objects in a deque are well-known, for purposes of clarity, they will not be described hereafter in detail.

Like the page deque, the compound page folio object 2006 also has its own page iterator 2008 and an associated page range 2010. The compound page folio object allows sets of pages to be combined in various ways to produce other complex structures and will accept any page folio object including other compound page folio objects. Therefore, compound page folio objects can be nested to any given depth.

Figure 21:
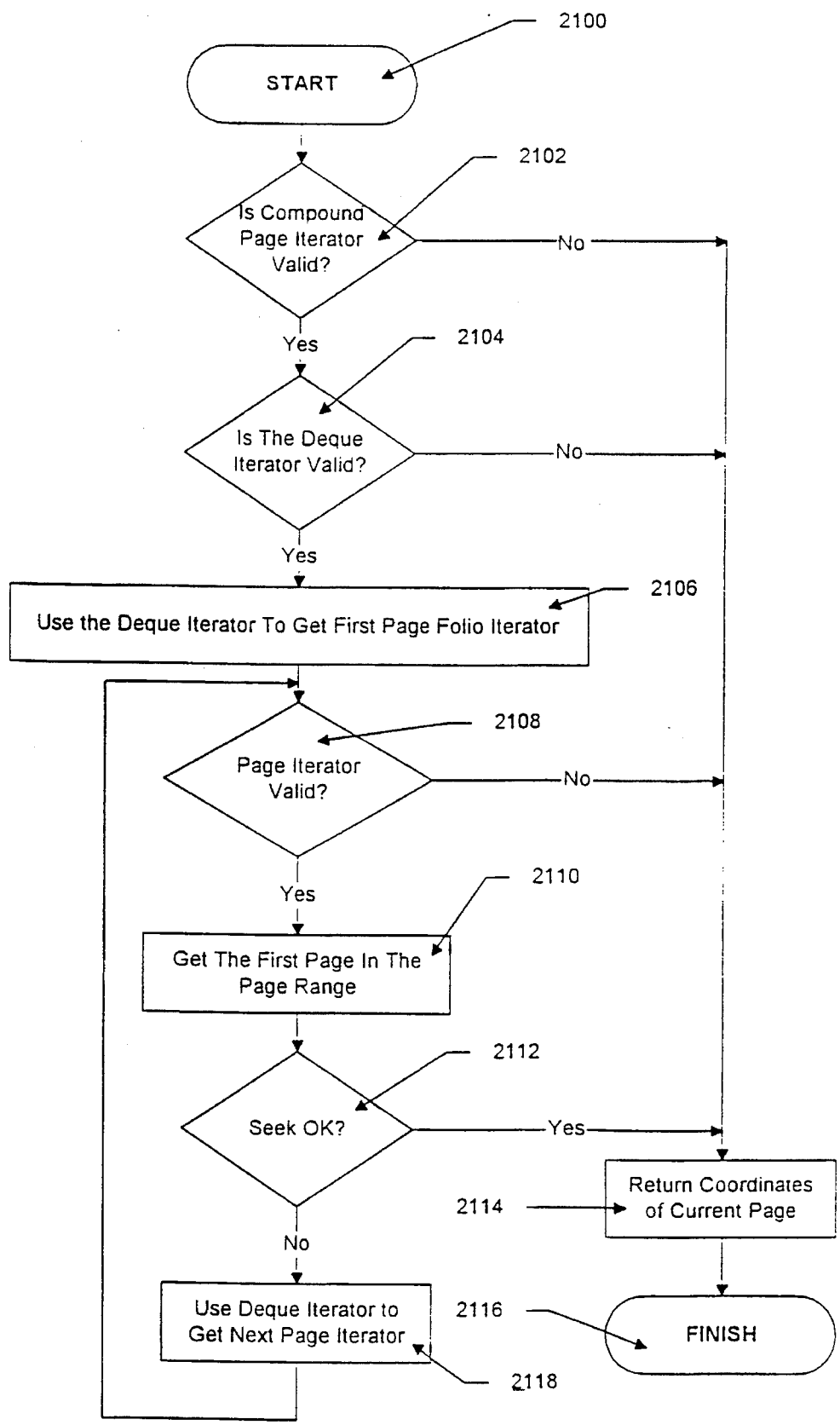
FIG. 21 is an illustrative flowchart of a printing routine used by a compound page folio iterator to select the first page in a preselected scan order for printing.

Internally, the entities that are actually stored in deque structure are the page iterators for each of the associated page folio objects. When a page folio object is added to the page deque, the corresponding page folio iterator is created and the iterator is added instead. Consequently, the pages in compound page folio can be printed by simply sequentially calling the iterators of each of the page folio objects stored in the deque. In particular, during the printing process, the page iterator 2008 calls the deque iterator 2004 which thereupon selects the first iterator stored in the page deque. This selected page iterator is then iterated through all of its pages to print the pages in its associated page folio object. The deque iterator then calls the next page iterator from the deque and operation proceeds in this way until all of the pages in the compound page folio have been printed. This printing operation is shown in detail in FIG. 21.

During a printing cycle, the compound page iterator functions much as the page iterator associated with the tiled page folio and the book page folio, previously discussed. The actual printing routine is essentially the same as that shown in FIG. 19 with the exception that the SeekFirstPageInRange and the SeekNextPageInRange functions used in the page iterator printing routine have been modified to accommodate the indirect use of multiple page iterators.

More specifically, the SeekFirstPageInRange routine used in the compound page iterator starts in step 2100 and, in step 2102, the routine checks to see whether the compound page iterator is valid. If it is not, the coordinates of the current page are returned in step 214 with the routine finishing in step 2116.

Alternatively, if, in step 2102, the compound page iterator is found to be valid, the deque iterator is checked for validity in step 2104. If this latter iterator is found to be invalid, the routine again proceeds through step 2114 to finish in step 2116. However, if the deque iterator is determined to be valid in step 2104, then in step 2106, the deque iterator is used to retrieve the first page folio iterator from the deque associated with the compound page object. This iterator is then checked for validity in step 2108 with the routine ending in steps 2114 and 2116 if the first iterator is found to be invalid. Alternatively, if the first page iterator is valid, in steps 2110, the validated iterator is used to retrieve the first page in the preselected page range by means of a SeekFirstPageInRange routine such as that shown in, and previously described in connection with, FIG. 17.

In step 2112, a SeekOK routine is checked to make sure the previous retrieval returned valid page coordinates and, if it did, the coordinates of the current page are then returned and the routine ends with steps 2114 and 2116, respectively. If the SeekFirstPageInRange routine in step 2110 did not produce a valid page coordinates then, in step 2118, the deque iterator is used to retrieve the next page iterator in the deque. The routine then proceeds to step 2108 to check whether the page iterator is valid and, if so, that iterator is then used to retrieve the first page in its associated page folio. Operation continues in this manner until either the first page is successfully obtained from a page folio at which time the SeekOK routine in 2102 returns valid coordinates of the selected page or until no valid page iterators remain in the page deque, at which point the coordinates of the current page are returned.

Figure 22:
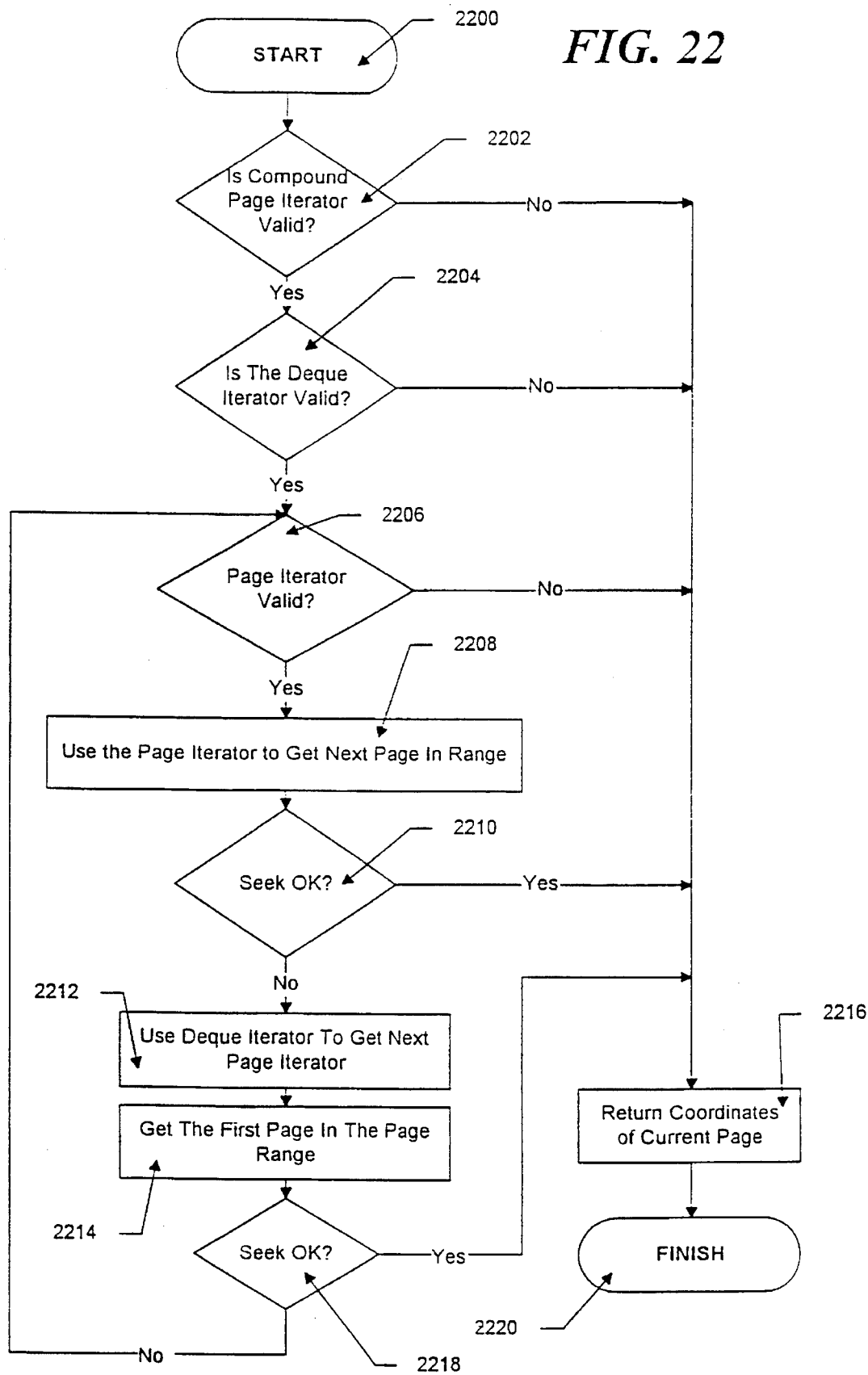
FIG. 22 is an illustrative flowchart of a printing routine used by a compound page folio iterator to select the next page in a preselected scan order for printing.

The SeekNextPageInRange routine also used in the printing of the compound page folio is shown in detail in FIG. 22. This latter routine functions in a similar manner to the SeekFirstPageInRange routine of the compound page folio previously discussed in that page iterators are sequentially retrieved from the page deque and then each page iterator is used to retrieve the next page in its associated range. The SeekNextPageInRange routine for the compound page folio object is shown in detail in FIG. 22. After starting in step 2200, both the compound page iterator and the deque are checked for validity in steps 2202 and 2204, respectively. If, in either case, the iterator is found invalid, the routine returns the coordinates of the current page in step 2216 and finishes in step 2220.

If, in steps 2202 and 2204, both the deque and the compound page iterators are determined to be valid, in step 2206, the current page iterator is checked for validity and an invalid page iterator causes the routine to exit in step 2220 after returning the coordinates of the current page in step 2216. If the current page iterator is validated in step 2208, the page iterator is used to get the next page in associated page folio by using a SeekNextPageInRange routine such as those previously discussed and, in step 2210 a check is made to determine the next page coordinates are valid. If the seek returned a valid page, the coordinates of that page are returned in step 2216 and the routine finishes in step 2220.

Alternatively, if, in step 2210, it is determined that the seek did not result in valid page coordinates (possibly indicating that the current page iterator has reached the end of its range), the deque iterator is used to get the next page iterator as outlined in step 2212. Subsequently, in step 2214, the newly-obtained iterator is used to get the first page in the associated page folio using a seek routine as previously described.

In step 2218, the seek used to get the first page in the page folio is checked to determine if the returned coordinates are valid, if so they are returned in step 2216 and the routine finishes in step 2220. Alternatively, if the seek used to get the first page in the new page folio does not return valid coordinates, then the routine returns to step 2206 where the page iterator is checked for validity, and if the page iterator is still valid, then it is used to retrieve the next page in the range as previously described. In this manner, the routine repeats until all page iterators stored in the page deque have been cycled through or a valid next page is obtained.

PAGE COMPOSITOR OBJECT

The last major printing object is a page compositor object which performs pre-print processing for regular printable documents and can be used to add enhancements to pages such as registration marks, adornments, cut and fold marks, notations and process color signatures. Other functions which can be performed include the creation of labels, n-up printing or simply changing the existing page borders. A page compositor can be tailored to specific page folio targets, but a compositor as no inherent order or target information. Compositors that are created in accordance with the present invention can be applied to any page folio target and can be nested to any depth. A page compositor object can also be printed, but it cannot print without a page folio target to print.

In general, each page compositor performs one specific function. For example, a particular page compositor may add registration marks to a target page folio document. Another page compositor may add special borders, etc. For purposes of illustration, two specific page compositor objects are described in detail herein, which objects perform page imposition and n-up printing.

Figure 23:
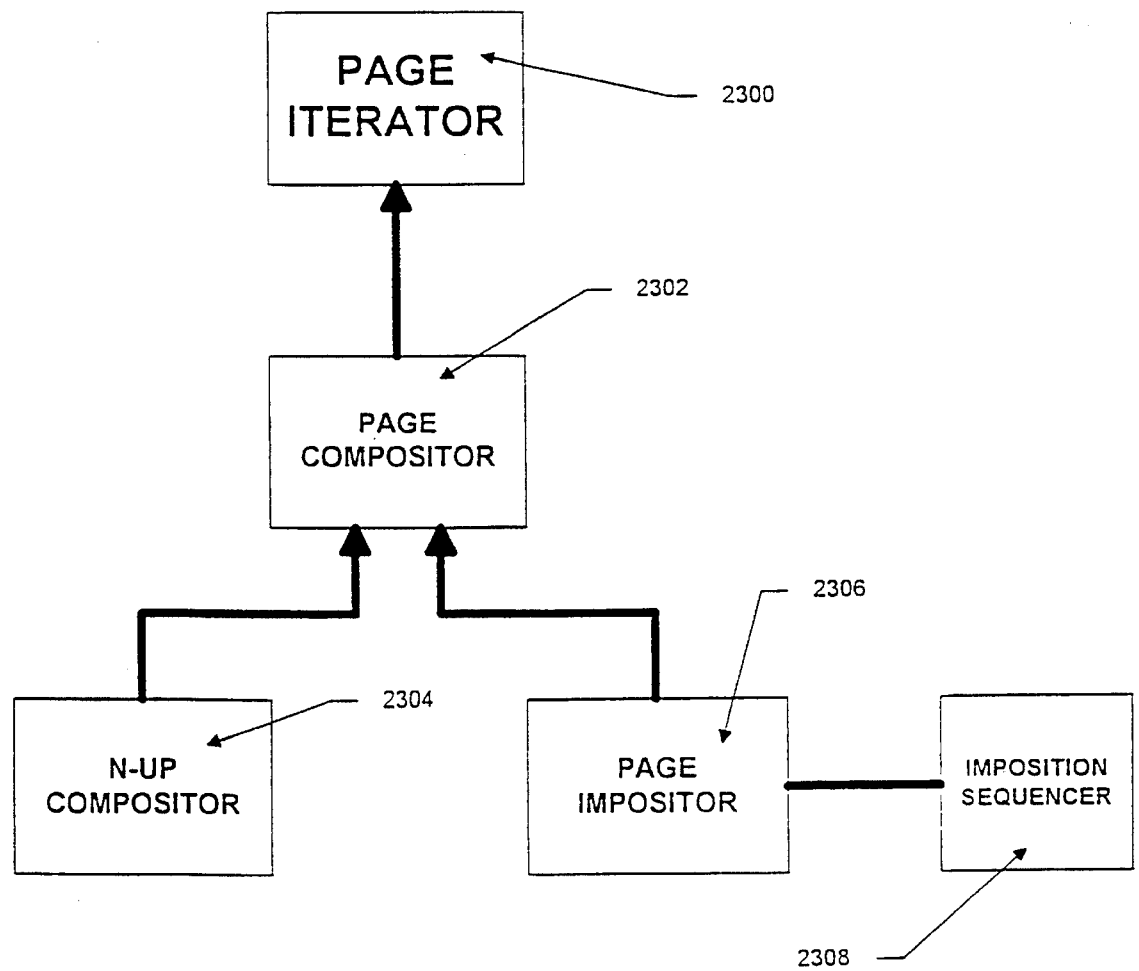
FIG. 23 is a simplified class hierarchy diagram illustrating the base, subclasses and associated classes involved in the construction of a page compositor object.

FIG. 23 shows a simplified class hierarchy diagram for the page compositor object. As shown, the page compositor class 2302 is a subclass of the page iterator class 2300, which class has been discussed in detail above with regard to previous page folio objects (however, the page compositor class need not be a subclass of the page iterator class). As illustratively shown in FIG. 23, the page compositor class 2302 has two subclasses: an n-up compositor class 2304 and a page impositor class 2306. In accordance with the previous discussion, other subclasses may be constructed to provide other page composition functions, such as the addition of borders, etc. In addition, the page impositor 2306 has associated with it an imposition sequencer 2308.

Because the page compositor class 2302 is a subclass of the page iterator class 2300, it inherits many of the functions present in the page iterator class including the primary printing routines previously discussed. The page iterator object constructed from the classes illustrated in FIG. 23 and its operation and functions will be described in detail in connection with the discussion below of the n-up compositor object and the page impositor object.

The process of n-up printing has already been partially described in connection with the paginator object. N-up printing is the process of positioning multiple page views (or partial page views) onto a single sheet of paper where the views are all positioned with the same orientation. In contrast, imposition is a process of positioning multiple pages onto a single sheet of paper so that when the sheet of paper is folded in a given sequence and cut along certain folds, a readable document with a proper page order is produced. The type of imposition desired is determined by a variety of factors, including the number of pages on each sheet, whether the sheet is printed on both sides or only one side and the method for folding the sheet.

Figure 24A:
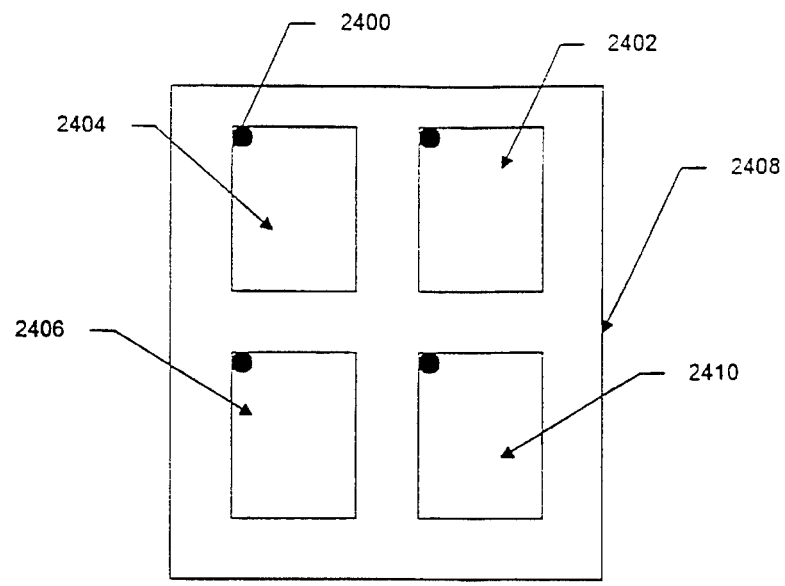
FIGS. 24A–24B are schematic diagrams of page layouts performed by n-up page compositor objects and page impositor objects.

The differences between n-up printing and imposition are illustrated in FIG. 24. In particular, FIG. 24A shows the output prepared in accordance with 4-up printing in which 4 pages are printed on a single sheet of paper. In particular, pages 2402, 2404, 2406 and 2410 are arranged on a single sheet of paper 2408 with the black dots (of which dot 2400 is illustrative) indicating the position of the upper left hand corner of each page. As can be seen, all of the pages are oriented in a similar manner.

Figure 24B:
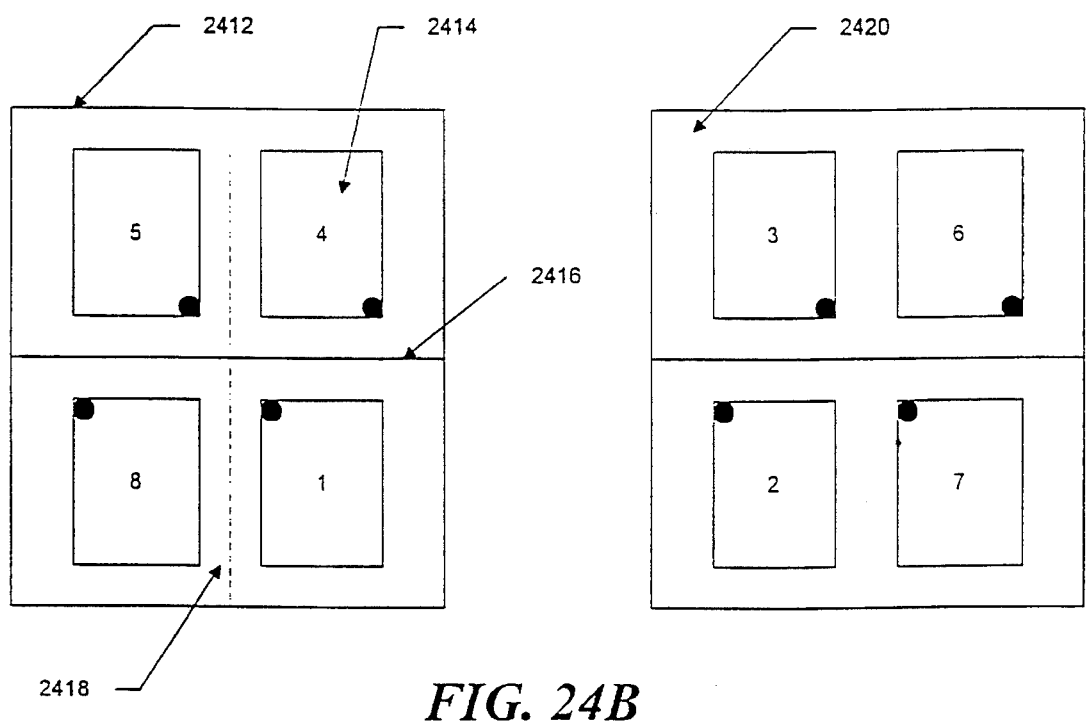

In contrast, FIG. 24B illustrates an imposition print for producing an eight-page booklet from a single sheet of paper printed on both sides. Page 2412 shows the arrangement of the front side of the page and page 2420 shows the arrangement of the back side. Dotted lines, such as dotted line 2418, indicate a fold line and solid lines, such as line 2416, indicate a cut line. The pages for the booklet must be placed on the sheet so that the front and back of each page have the proper sequence and so that the "imposed" position and orientation of each page on the sheet cause the pages to appear in the correct order and with the correct orientation in the final product. The imposition compositor object accomplishes this task; as with FIG. 24A, the black dot in the corner of each page indicates the upper left hand corner and the pages are numbered as shown in the center of each page. For example, page 2414 corresponds to page 4 of the final booklet.

Figure 25A:
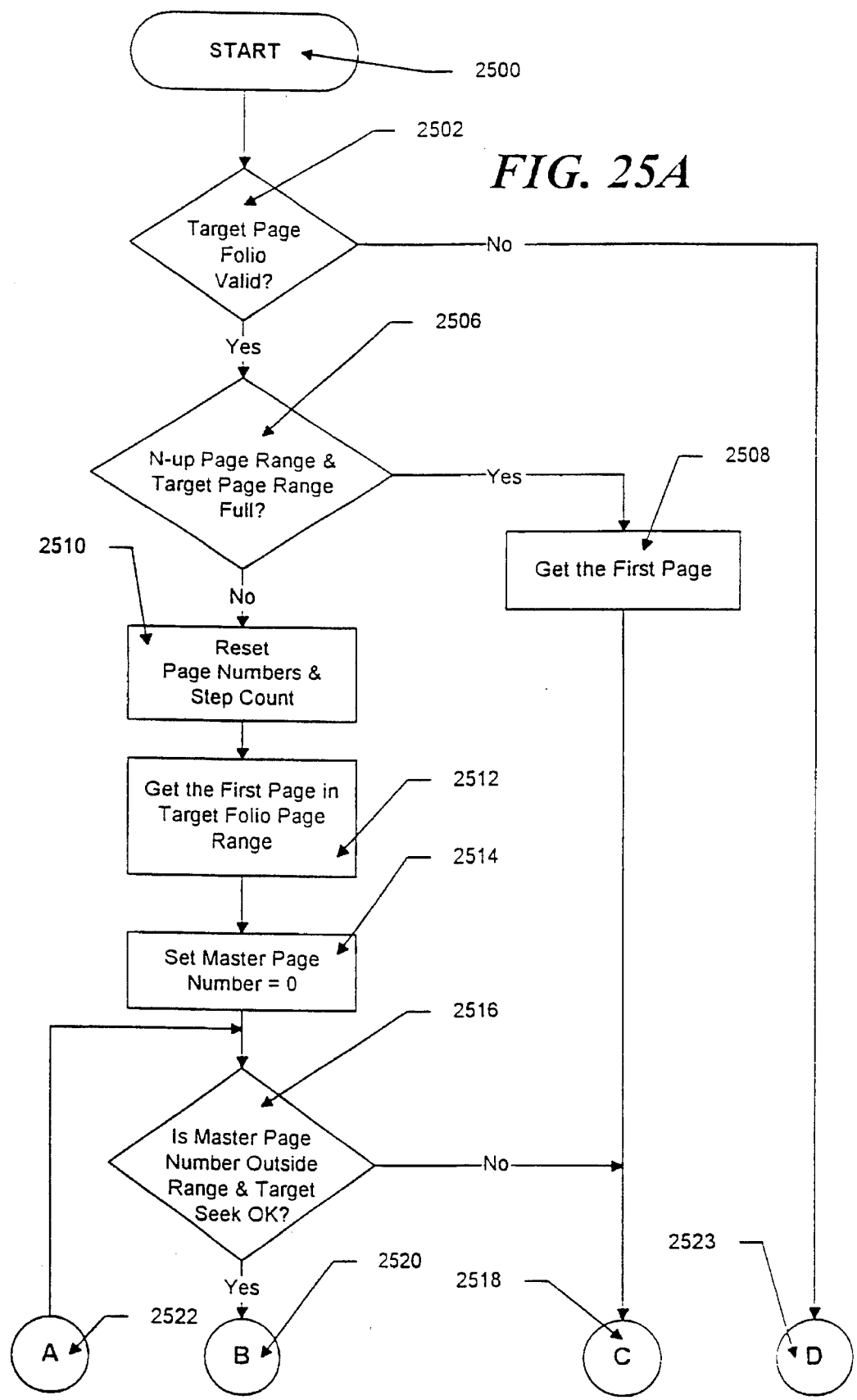
FIGS. 25A–25B constitute two parts of an illustrative flowchart of a printing routine used by an n-up page compositor object to select the first page in a preselected scan order for printing.
Figure 25B:
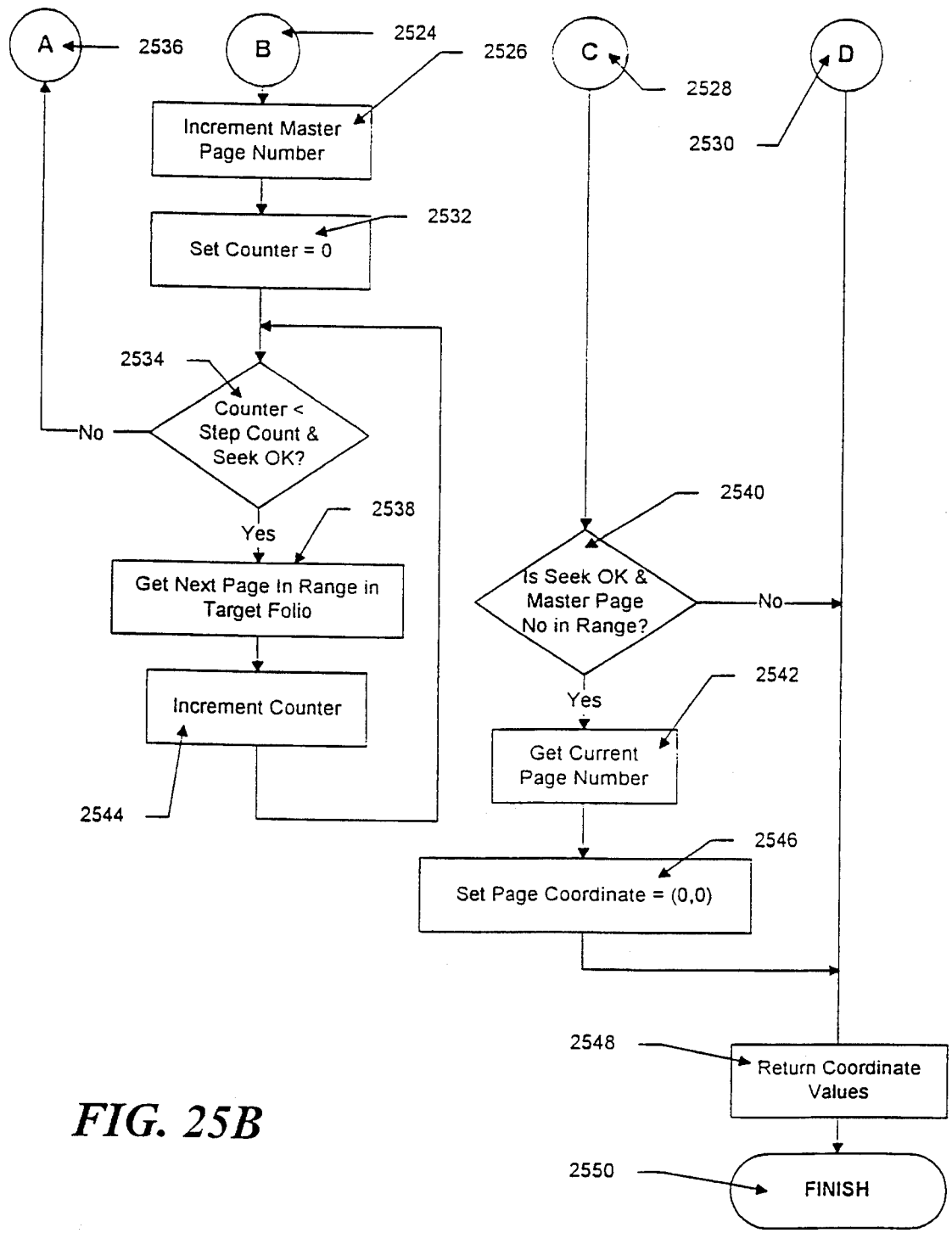

Since the n-up compositor is a subclass of the page compositor which is, in turn, a subclass of the page iterator class, the printing function that is used by the n-up compositor is similar to that used by the page iterator (shown in FIG. 19) with the exception that the SeekFirstPageInRange and the SeekNextPageInRange routines are different. These latter functions are complicated by the fact that, in the n-up compositor, a set of images is being arranged on a single page. The SeekFirstInRange function used in the n-up compositor sub-object is shown in detail in FIGS. 25A and 25B. When arranged vertically, these figures form a single flowchart that illustrates the SeekFirstPageInRange routine.

The internal printing routines in the n-up compositor object utilize several internal variables to keep track of the pages as each page is being formed. Each page (which is formed of sub-pages is denoted by a master page number and the total number of pages on each master page is governed by a step count. The application program supplies the step count and a page range for the master pages. These variable allow the printing routine to print some or all of the pages in the underlying page folio. The SeekFirstPageIn-Range routine starts in step 2500 and proceeds to step 2502 where the target page folio is checked for validity. If the target folio is invalid, the routine proceeds, via linking circles 2523 and 2530, to step 2548 in which the present page coordinate values are returned; the routine then finishes in step 2550.

Alternatively, if, in step 2502, the target page folio is found valid, the routine proceeds to step 2506 in which the n-up object page range and the target folio page range are checked, and, if both of these ranges are full, then all pages in the document are included in the range and the first page can be obtained by simply retrieving the first page in the document. In this case, the routine proceeds to step 2508 in which the coordinates of first page in the scan order are obtained. Via linking circles 2518 and 2528, the routine proceeds to step 2540 in which the seek function that was used to obtain the first page coordinates in step 2508 is checked to ensure that the first page is valid. In addition, a further check is made to make sure that the master page number for the page being processed is in the range supplied by the application program.

If the master page number of the current page is outside the range specified by the application program, then the routine proceeds to return the present page coordinates (in step 2548) and ends in step 2550.

Alternatively, if the first page obtained by the seek routine is valid and the master page number lies within the specified range, then the current page number is obtained in step 2542, the current page coordinates are set to (0,0) in step 2546 and returned in step 2548 and the routine ends in step 2550.

Returning to step 2506, if there are pages in the n-up page range and in the target page range, then a seek setup is performed in step 2510 in which internal page number variables and the step count are reset to values provided by the application program. The routine then proceeds to step 512 in which the first page in the target folio page range is obtained using a SeekFirstPageInRange function previously defined for the target page folio and discussed above.

In step 2514, the master page number is set to 0 indicating that the first page is being examined. In decision step 2516, the new master page number is compared against master page number range specified by the application program. If the master page number falls within the page range and the previous seek operation indicated that the page retrieved is valid, then the routine proceeds, via linking circles 2518 and 2528 to step 2540 and, as previously described, the current page number is obtained. The page coordinates are set to (0,0) in step 2546 and returned in step 2548 and the routine finishes in step 2550.

However, if, in step 2516, the master page number is found to be outside the range provided by the application program, then the master page number is incremented until it falls within the range. Each time the master page number is incremented, the number of sub pages that are found on each master page must also be passed over in the target page folio. In particular, in this latter case, the routine proceeds through linking circles 2520 and 2524 to step 2526 in which the master page number is incremented. The target page folio pages corresponding to the master page which was just skipped over are then skipped by the loop comprising decision step 2534 and processing steps 2538 and 2544. In particular, a loop counter is set zero in step 2532 and compared to the step count in step 2534. If the counter variable is less than the step count then the next page is retrieved from the target page folio in step 2538 which uses a SeekNextPageInRange function such as those previously described.

To continue the loop, the counter variable is incremented in step 2544 and the loop is repeated until a number of sub pages corresponding to the master page has been skipped over. At this point, the routine returns, via linking circles 2536 and 2522, to step 2516 where the new master page number is then compared against the target range. Once again, if the master page number is still outside the target range then the process is repeated, until eventually the master page number falls within the target range. In this latter case, the routine proceeds through linking circles 2518 and 2528 to get the current page number and return the current page coordinates.

Figure 26A:
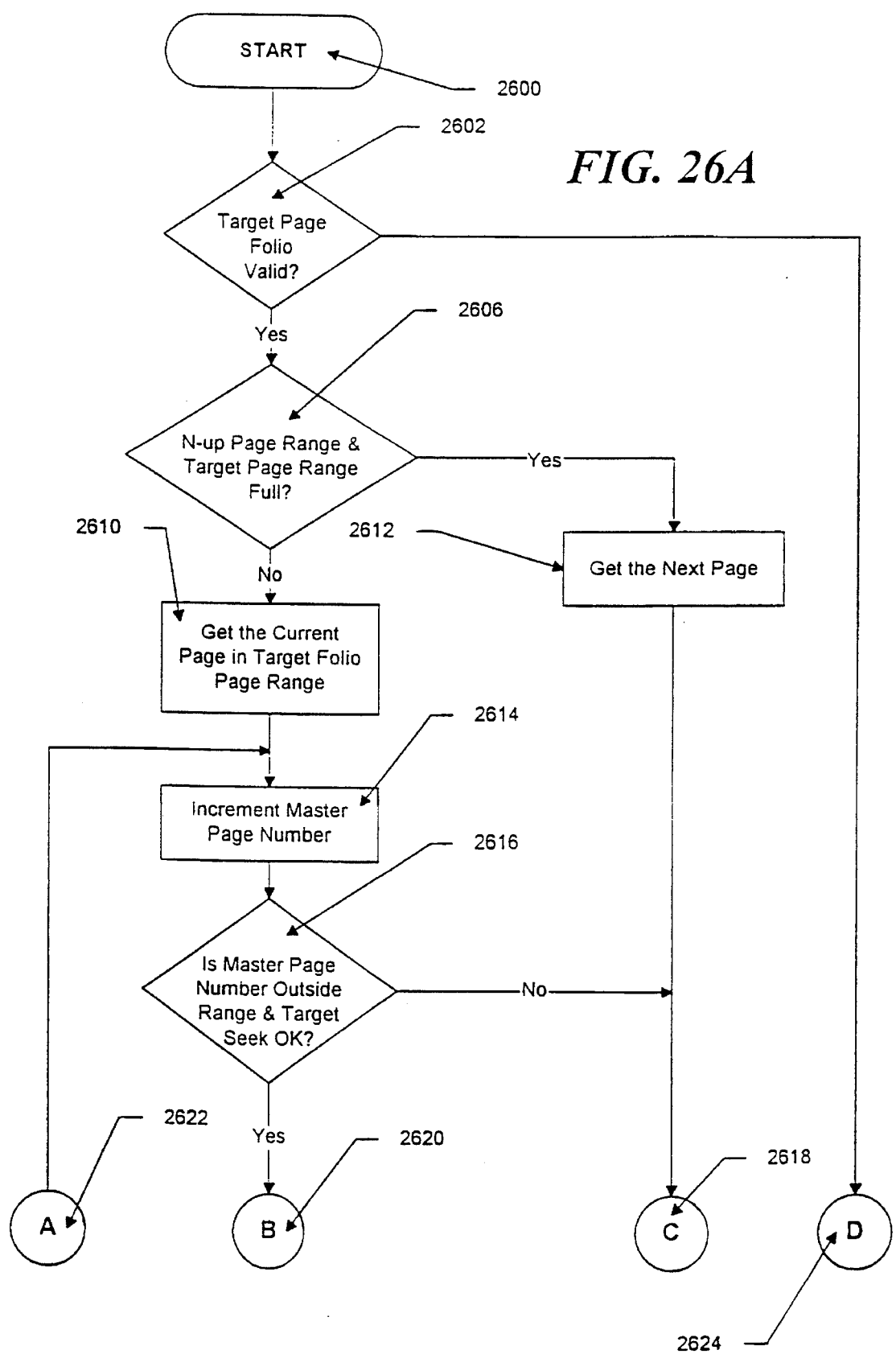
FIGS. 26A–26B constitute two parts of an illustrative flowchart of a printing routine used by an n-up page compositor object to select the next page in a preselected scan order for printing.
Figure 26B:
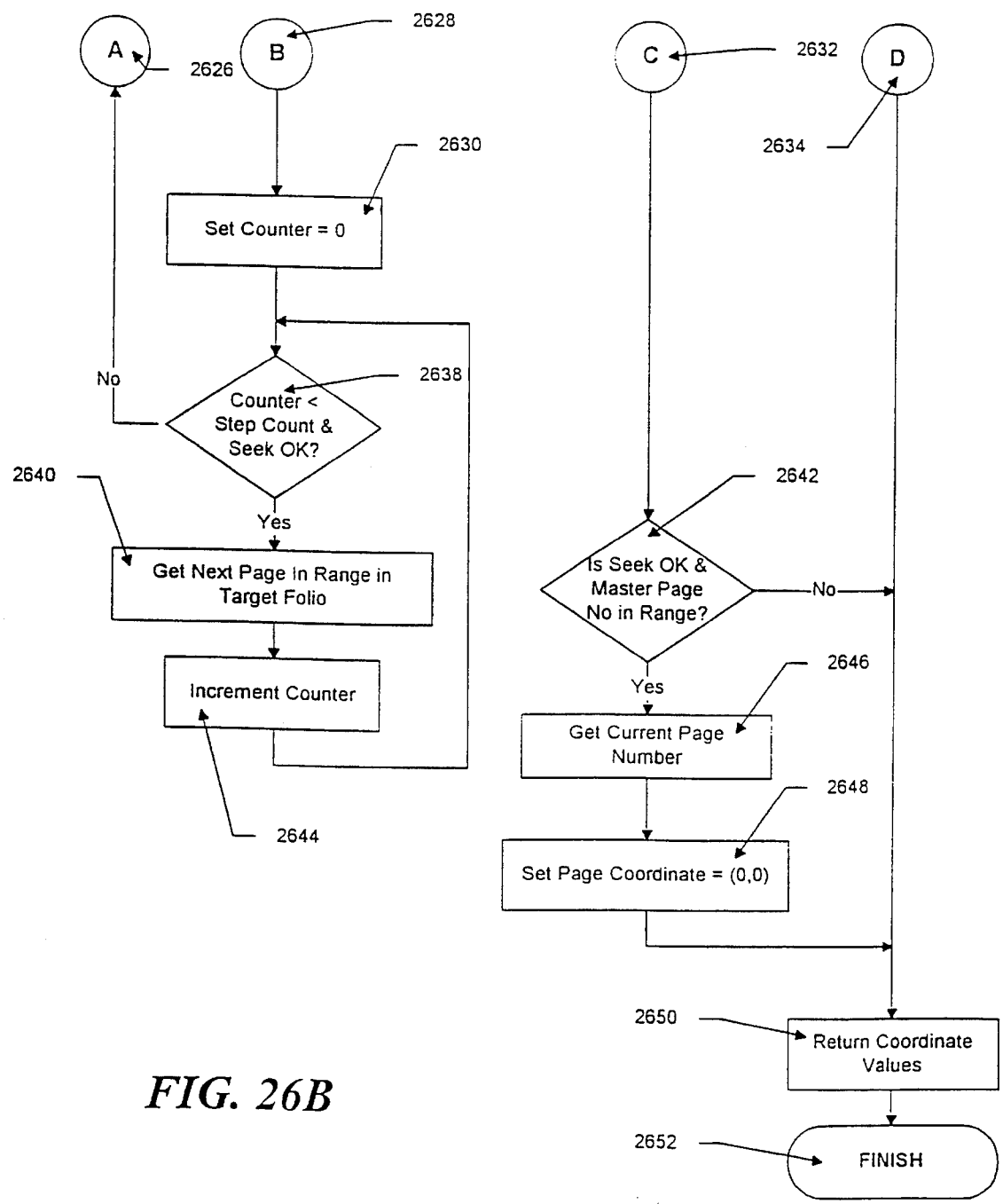

The n-up page compositor print routine also includes a SeekNextPageInRange function which is shown in detail in FIGS. 26A and 26B. Like FIGS. 25A and 25B, FIGS. 26A and 26B, when placed vertically together, form a complete flowchart detailing the operation of the n-up compositor in performing the SeekNextInRange function.

This routine starts in step 2600 and proceeds to step 2602 where the target page folio is checked for validity. If the target folio is not valid, the routine proceeds through linking circles 2624 and 2634 to step 2650 where the page coordinate values of the current page are returned and the routine finishes in step 2652.

Alternatively, if the target page folio is found valid in step 2602, the n-up page range and the target page folio range are checked to see whether all document pages are included in these ranges. If so, the next page in the grid sequence is obtained and the routine proceeds through linking circles 2618 and 2632 to step 2642, in which the master page number is checked to see if it is within the predetermined range. If not, the current page values are returned in step 2650 and the routine finishes in step 2652.

Alternatively, if, in step 2642, the master page number is within the specified range, the current page numbers are obtained in step 2646, the page coordinates are set to (0,0) in step 2648 and the page coordinates are returned in step 2650 with the routine finishing in step 2652.

Figure 27:
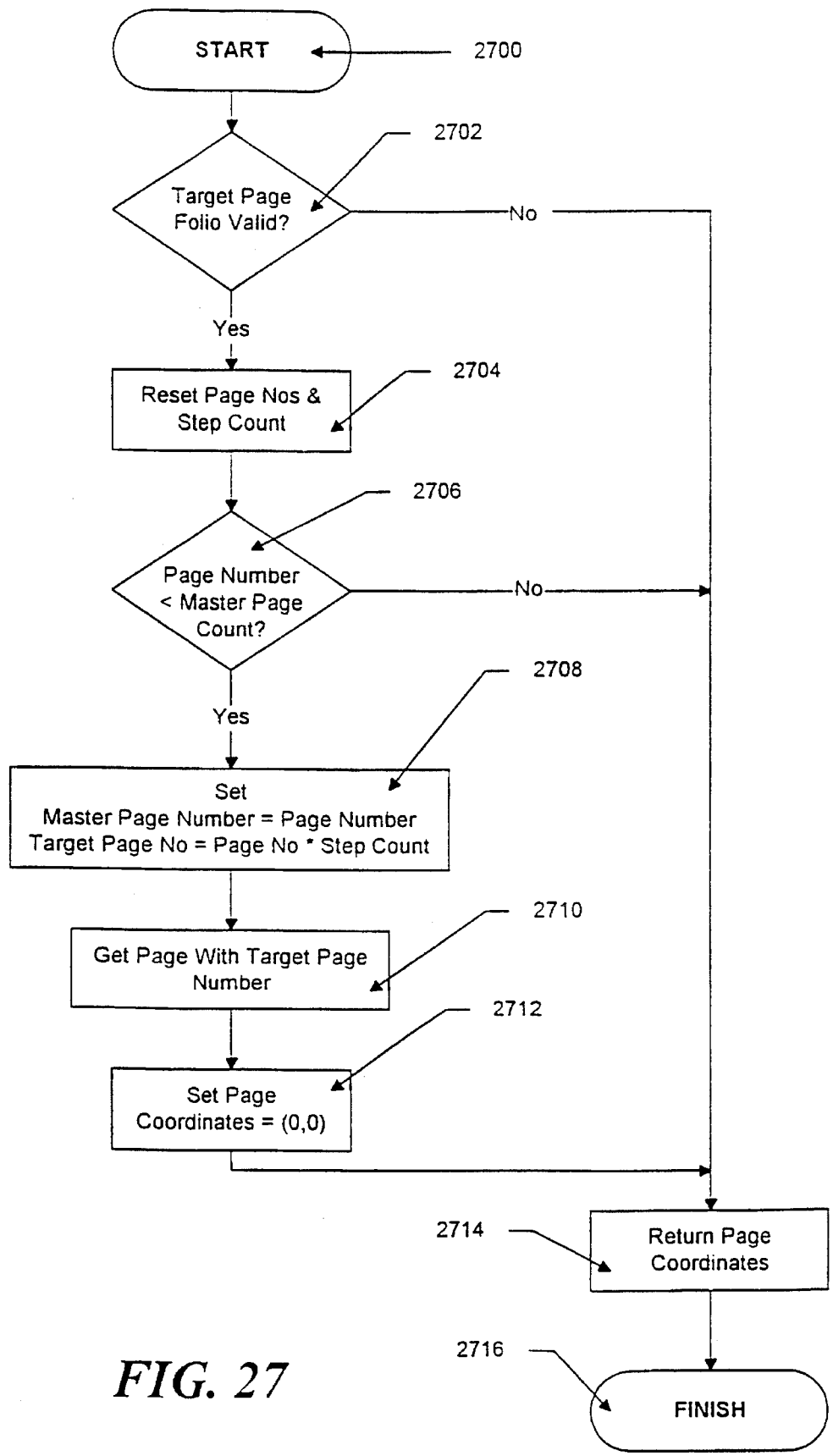
FIG. 27 is an illustrative flowchart of a printing routine used by an n-up page compositor object to select a particular page in a preselected scan order for printing.

Returning to step 2606, if there are pages in the n-up page range and the target folio page range, then the routine proceeds to step 2610 in which the current page in the target folio range is obtained. This latter operation is performed by using a SeekToPageNumber routine which is shown in detail in FIG. 27.

Assuming, for the moment, that the page coordinates of the current page have been obtained in step 2610, the routine proceeds to step 2614 in which the master page number is incremented. In step 2616, the incremented master page number is compared against the application-specified master page range to determine if the next master page will fall within the application-specified range. If not, the routine proceeds, via linking circles 2618 and 2632, to get the current page number in step 2646, to set the page coordinates to (0,0) in step 2648, to return the page coordinates in step 2650 with the routine finishing in step 2652.

In step 2616, if the master page number falls outside the specified range, then the routine proceeds, via linking circles 2620 and 2628, to increment the master page number and advance the corresponding number of sub pages in the target folio until the master page number falls within the predetermined range. This operation is performed by a program loop governed by a loop counter. In step 2630, the loop counter is set to zero and, in step 2638, the current loop count is compared to the step count which indicates the total number of sub pages on each master page. In step 2638, if the loop counter is less than the step count indicating that additional pages can be placed on the master page being examined, the next page in the target page folio is obtained in step 2640 and the loop counter is incremented in step 2644. The routine then proceeds to step 2638 where the incremented loop counter is again compared to the step count. Operation proceeds in this matter until all pages on each master page which is bypassed are also skipped in the target page folio.

When step 2638 indicates that the number of pages equal to the step count has been skipped over, the routine then exits the loop and proceeds, via linking circles 2626 and 2622, back to step 2614 where the master page number is again incremented and then, in step 2616, compared to the application-specified range. Eventually, the master page number will fall within the application-specified range and the routine proceeds to step 2642, via linking circles 2618 and 2632, to finish, as previously described.

As described above, a separate routine is used to obtain the value of the current page number from the master page number and the step count. In particular, this latter routine is shown in detail in FIG. 27, and starts in step 2700. The routine then proceeds to step 2702 where a check is made to determine whether the target page folio is valid. If not, the current page coordinates are returned in step 2714 and the routine finishes in step 2716.

Alternatively, if the target page folio has been found valid in step 2702, the routine proceeds to step 2704 in which the page number and step counter are reset from application specific values. Next, in step 2706, the master page number is compared against the total master page count and, if the master page exceeds the total count, then the routine proceeds to return the current page coordinates in step 2714 and end in step 2716.

Alternatively, if, in step 2706, the master page number is determined to be less than the total page count, the routine then proceeds to step 2708 where the master page number is set to the current page number and a new target page number corresponding to the current page in the target page folio is determined by multiplying the master page number and the step count. When the target page number has been obtained in step 2708, the corresponding page is retrieved in step 2710, the current page coordinates are set to (0,0) in step 2712 and the routine proceeds to steps 2714 and 2716 where the page coordinates are returned and the routine finishes.

The page impositor object functions in a similar manner to the n-up compositor object in that sub pages are positioned onto master page, however, there are differences in the two functions which differences will be discussed in detail below. Several terms are used in the imposition process and facilitate in understanding the process. In particular, the term "sections" (also called "signatures" or "sleeves") refers to collections of pages that are placed together like sections of a newspaper; the terms "section, signature, or sleeve" are often used interchangeably. However, in the more formal sense a "section" is any collection of folded sheets bound together, a "signature" is all the pages of a publication printed on one folded page and a "sleeve" is an informal term which refers to any stack of sheets. The term "imposition" refers to the process of placing sub pages on sheets of paper for later binding so that the pages are all in proper order and orientation.

The page imposition object utilizes an additional object called a page imposition sequencer which is a stateless class that returns information about a particular imposition method. Except for the number of pages in a sleeve or section, a particular imposition sequencer object cannot be altered to define a new behavior. If a new behavior is desired, a new sequencer must be subclassed and created. Additional information which defines an imposition object includes whether a sheet is printed on both sides and the number of sheets in a sleeve or section.

Functions are provided in the page imposition object which receive a number in the imposition sequence, perform calculations and return the correct page number of the source document to be used for that position in the sequence. Additional functions also tell what rotation angle to use for that page in that position. In particular, the application program specifies a sequence of page numbers which are always provided in the normal raster sequence. The impositor page object returns the correct source page number for that position in the sequence.

Figure 28:
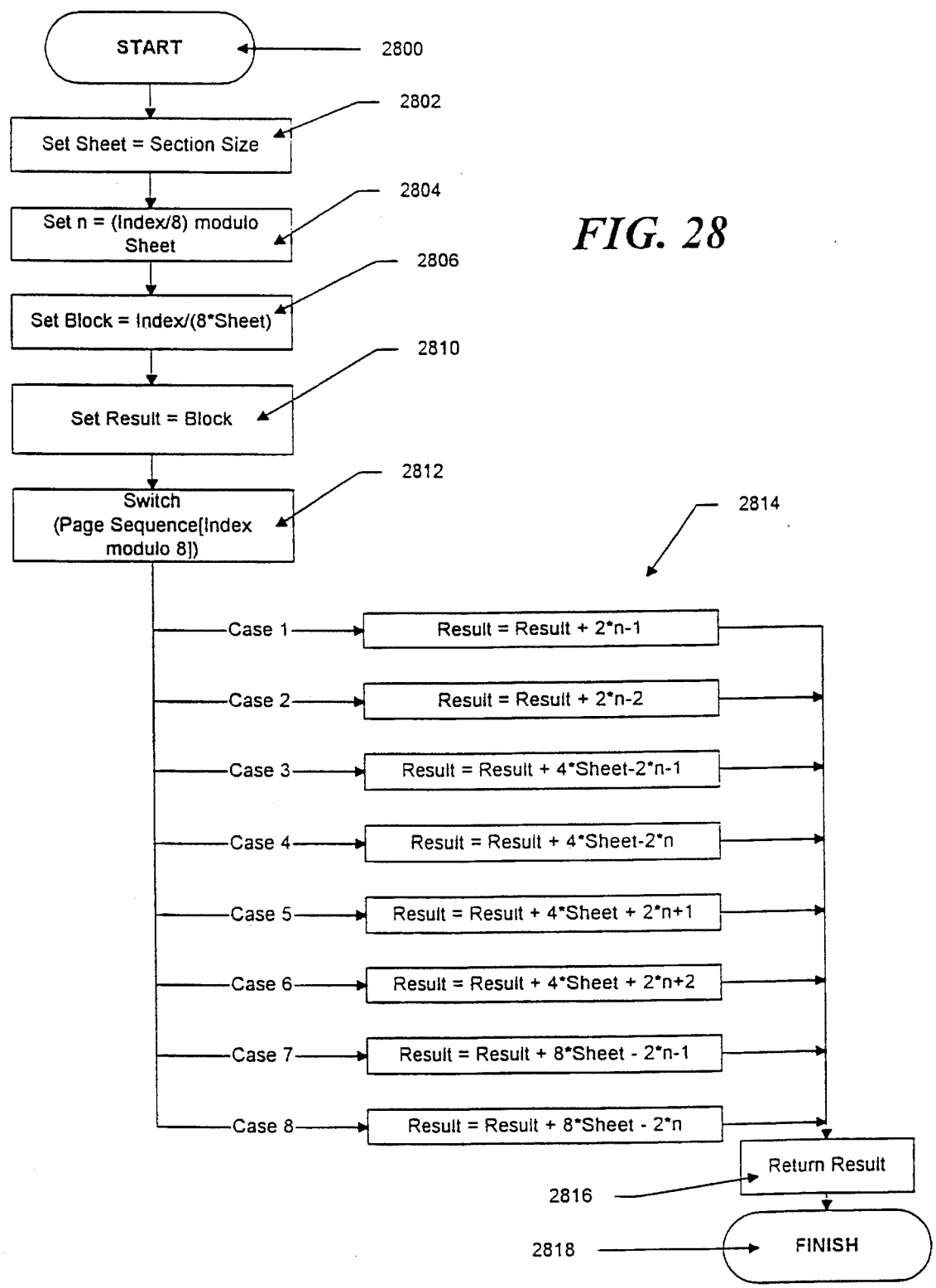
FIG. 28 is an illustrative flowchart of a routine used by the imposition sequencer to select the next page of the source document for imposition on a preselected page.

An illustrative routine which returns the page number of the source document to be used for a particular imposition position is shown in FIG. 28. This routine receives a page sequence, for example, an eight-page sequence such as [5, 4, 8, 1, 3, 6, 2, 7]. This sequence indicates the page number sequence for each of the pages which is being positioned on the master page.

The routine also receives an index number which indicates which of the eight pages is presently being positioned. The imposition routine starts in step 2800 and proceeds to step 2802 where a sheet variable is set to the section size provided by the application program. Next, in step 2804, an internal variable, n, is set to the index number divided 8 taken modulo the sheet number.

In step 2806, a internal "block" variable is set to the index number divided by 8 times the sheet number. Finally, in step 2810, an internal "result" variable is set to the "block" number.

The routine then proceeds to step 2812 which is a "switch" statement that results in the selection of one of possible multiple paths being selected. The switch path selection is determined by the page sequence number which appears at the position of the index modulo 8. In this position is a page number ranging between 1 and 8, and this page number is used to select one of the paths, 2814, which performs a calculation. In each of the paths, the result variable is incremented by a number which depends on the sheet variable and the number n is shown in FIG. 28.

The modified result variable is then returned in step 2816 and the routine finishes in step 2818.

Figure 29:
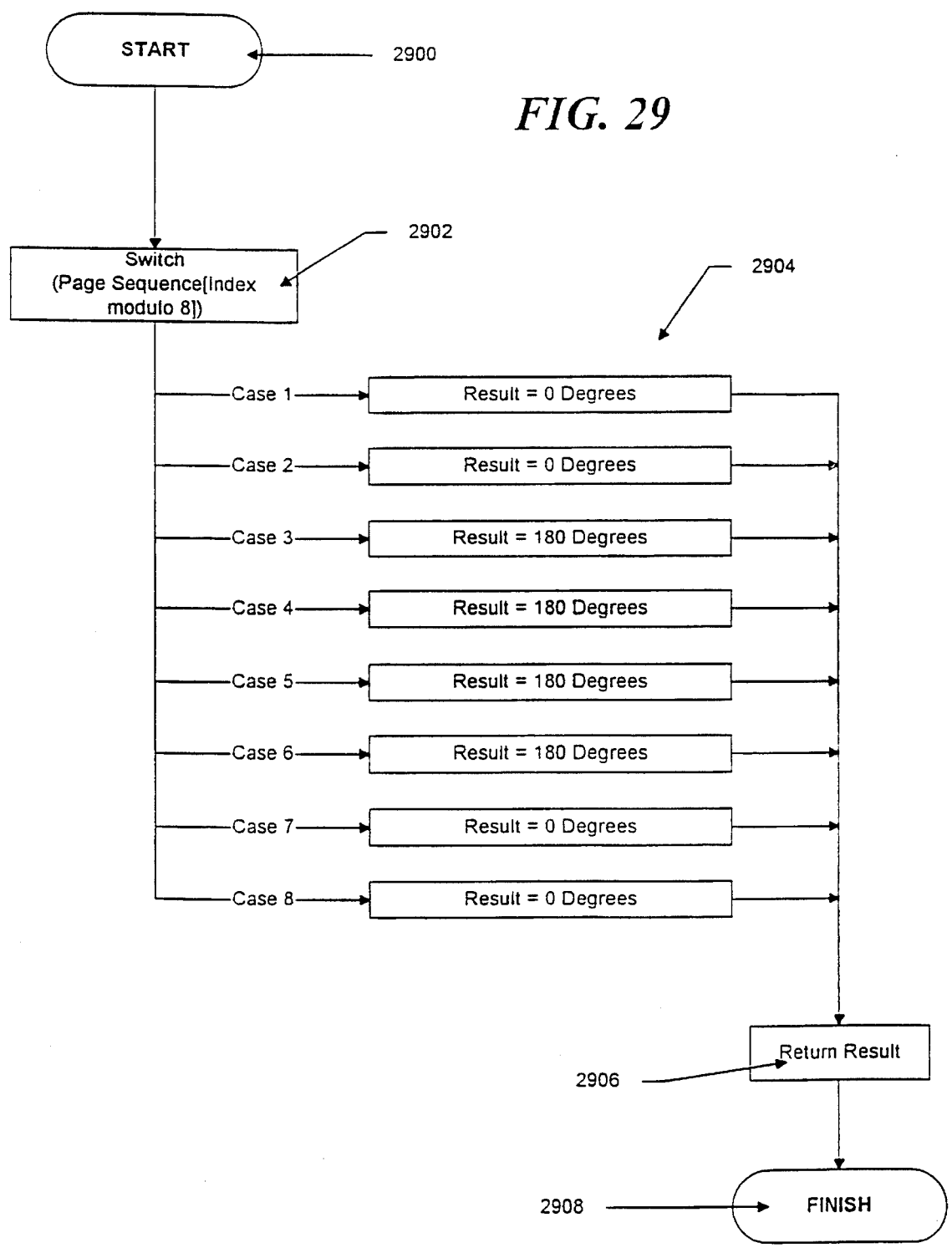
FIG. 29 is an illustrative flowchart of a routine used by the imposition sequencer to select the rotation of the selected source page for imposition on a preselected page.

A similar routine which determines the rotation of each pages is shown in FIG. 29. In the usual imposition arrangement, the rotation of each page will be either 0 degrees or 180 degrees; the pages are either printed in normal orientation or are flipped around the horizontal axis. The routine starts in step 2900 and proceeds to a "switch" step 2902 with the switch index computed from the page sequence number indexed by the index value modulo 8. Again the output of the switch calculation results in a number ranging between 1 and 8, which number is used to select one of the paths 2904. The selected path results in a rotation of 0 degrees or 180 degrees; the result is returned in step 2906 and the return finishes in step 2908.

Figure 19:
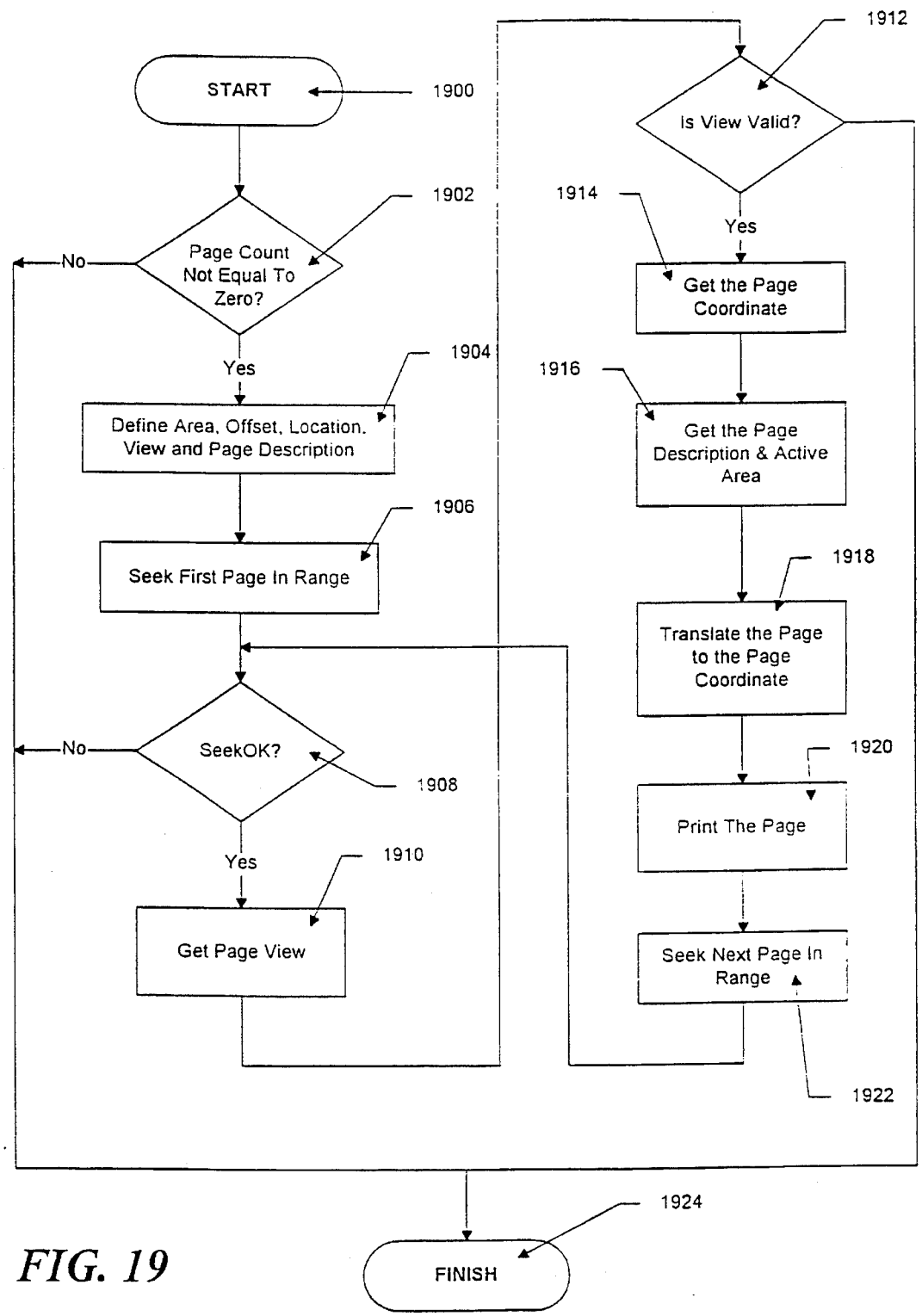
FIG. 19 is an illustrative flowchart of a routine used to print pages of a page folio object.

The printing routines utilized by the page impositor object are similar to those used by the page iterator object because the page impositor object is generated by a subclass of the class which constructs the page compositor object, which is, in turn, constructed by a subclass of the page iterator object. Accordingly, the routine used in FIG. 19 is used to print the pages and the SeekFirstPageInRange function used by the impositor object in the routine shown in FIG. 19 is shown in detail in FIG. 30. The routine starts in step 3000 and proceeds to step 3002 where the target page folio is check for validity. If the target page folio is not valid, the routine proceeds to step 3010, in which the current page coordinates are returned and the routine ends in step 3012.

Alternatively, if in step 3002, the target page folio is determined to be valid, the routine proceeds to step 3004 in which the impositor page range and the target page range are checked to see if they include all document pages. If so, the first page in the document is obtained in step 3008, its coordinates are returned in step 3010 and the routine finishes in step 3012.

Alternatively, if in step 3004, there are pages in the impositor page range and the target page range, then the page coordinates of an offset page in the range are retrieved in step 3006. The routine which performs the retrieval in step 3006 is shown in detail in FIG. 32 and will discussed later herein. After obtaining the offset page, the page coordinates are returned in step 3010 and the routine finishes in step 3012.

Figure 31:
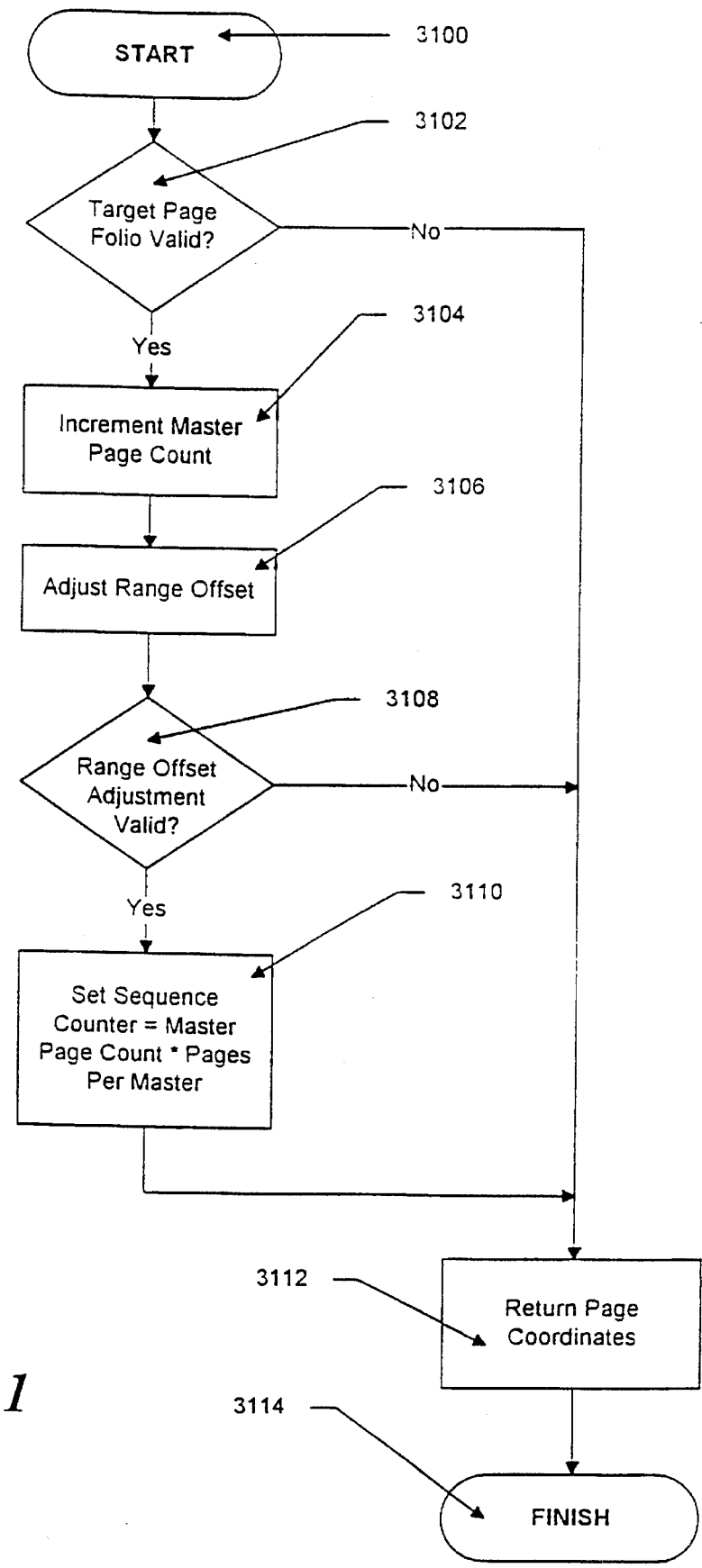
FIG. 31 is an illustrative flowchart of a printing routine used by a page impositor object to select the next page in a preselected scan order for printing.

The SeekNextPageInRange routine used in the impositor object is shown in detail in FIG. 31. This routine starts in step 3100 and proceeds to step 3102 where the target page folio is checked for validity. An invalid page folio results in the return of the current page coordinates (in step 3112) and the routine finishing in step 3114.

Alternatively, if the target page folio is valid, the master page counter is incremented in step 3104, the range offset is adjusted in step 3106 and the range offset is checked in step 3108 to determine whether the range offset causes the range to exceed the page range provided by the application program. If the range offset adjustment is invalid, then the routine proceeds to return the current page coordinates in step 3112 and finish in step 3114.

Alternatively, if in step 3108, the range adjustment is determined to be valid, then the sequence counter is reset in step 3110 to be equal to the master page count times the number of pages per master as provided by the application program. The routine then proceeds to return the page coordinates received from the range offset adjustment program in step 3112 and finish in step 3114.

Figure 30:
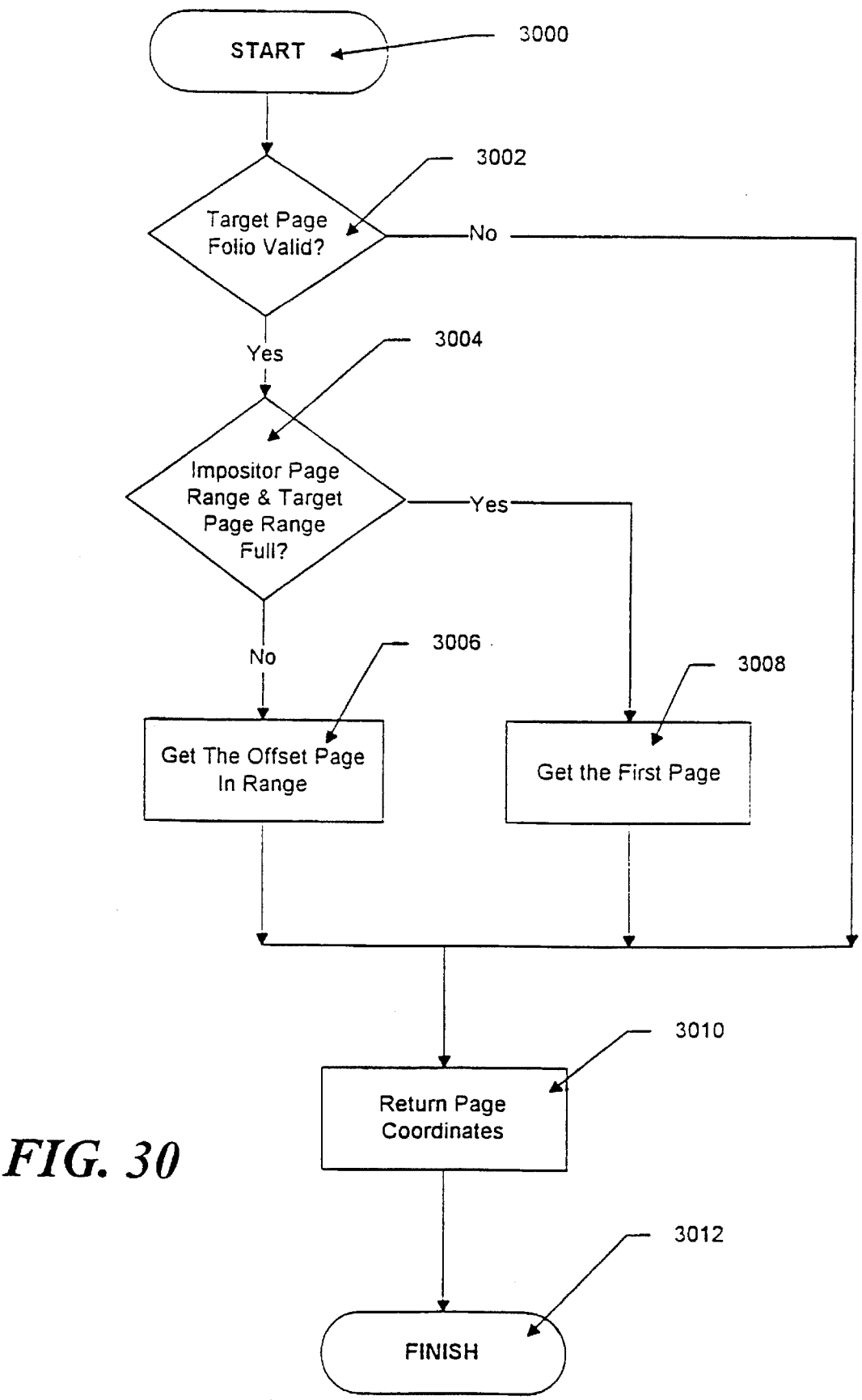
FIG. 30 is an illustrative flowchart illustrative flowchart of a printing routine used by a page impositor object to select the first page in a preselected scan order for printing.
Figure 32:
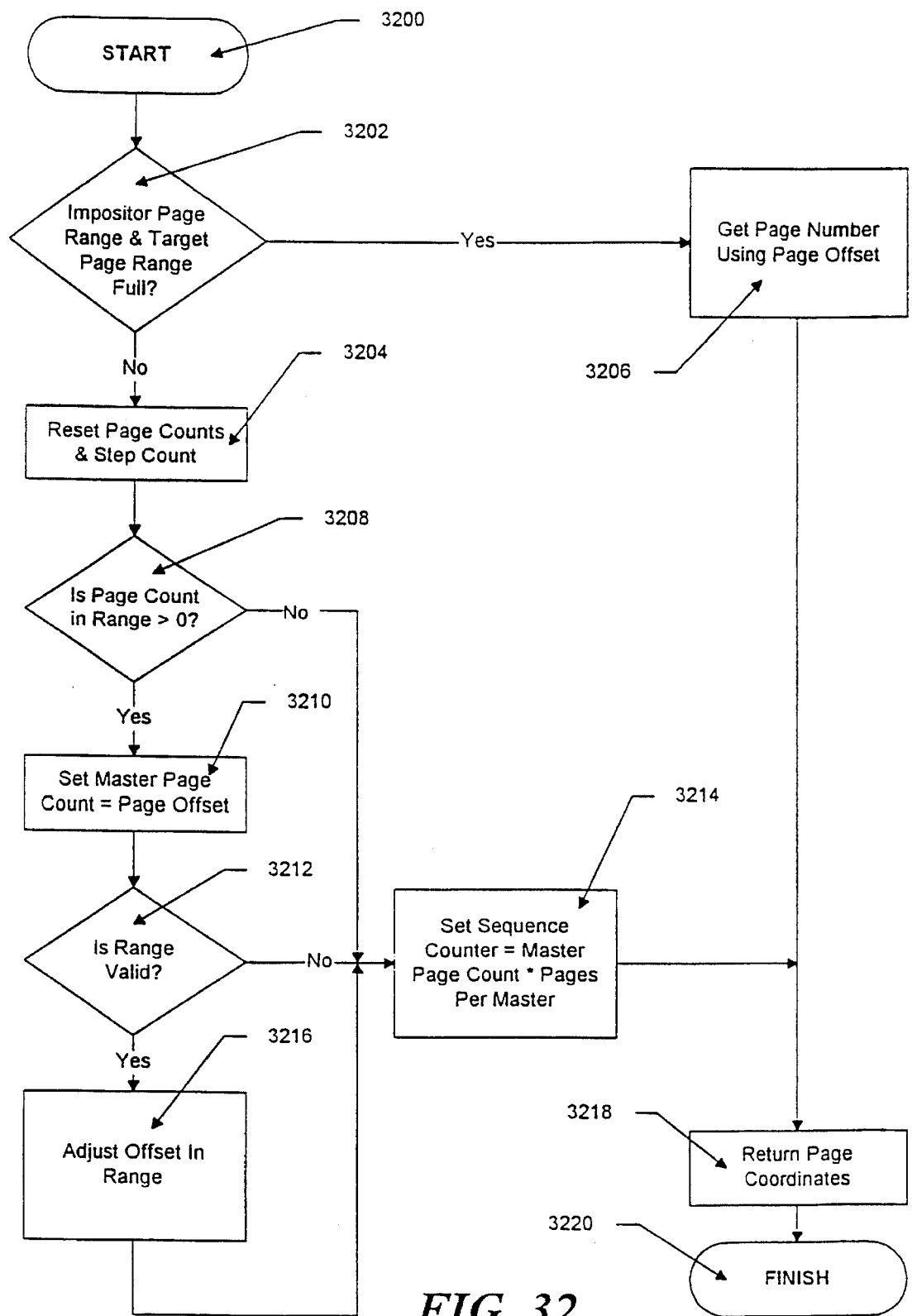
FIG. 32 is an illustrative flowchart of a printing routine used by a page impositor object to select a particular page in a preselected scan order for printing.

FIG. 32 shows in detail the routine is used to get the offset page in the range which is used in the SeekFirstPageInRange function shown in FIG. 30. In particular, the routine starts in step 3200 and proceeds to step 3202 where the impositor page range and the target page range are examined to determine if they contain all document pages. If so, in step 3206, the page number of the next page is retrieved using the predetermined page offset provided by the application program. The coordinates of this latter page are then returned in step 3218 and the routine finishes in step 3220.

Alternatively, if not all document pages are included in the impositor page range and the target page range, the routine proceeds to step 3204 in which the page counts and step count are reset using the application-provided values. In step 3208, the page count in the selected range is checked to see whether it is greater than zero. If it is not, then, in step 3214, the sequence counter is reset to the master page count times the pages per master. The page coordinates of the current page are returned in step 3218 with the routine finishing in step 3220.

Alternatively, if in step 3208, the page count in the range is greater than zero, then, in step 3210, the master page count is set to an offset number and, in step 3212, the page range is checked for validity. If the page range is not valid, the sequence counter is reset as previously described with respect to step 3214, the page coordinates are returned in step 3218 and the routine finishes in step 3220.

Alternatively, if in step 3212, the range is determined to be valid, then, in step 3216, the offset in the range is adjusted. The sequence counter is then reset in step 3214, the page coordinates returned in step 3218 and the routine finishes in step 3220.

PRINTING EXAMPLE

A complete printing example will now be discussed utilizing the inventive printing interface objects described in detail above and written in C++ code. It should be noted that this example consists of only a code fragment and is not a complete program. It will be illustrative to those skilled in the art as to the use of the printing interface classes, however, additional code must be provided to make application operable as would be understood by those skilled in the art. For example, some values which are specified in the code set forth below would actually be obtained from a user interface in the application program.

For the purpose of illustration, the printing example set forth below will create a brochure with four copies of an animation (cartoon) followed by two pages of text. The four animation copies are designed to appear on one page. Also, for illustrative purposes, the animation view is assumed to be an animation graphic about 4 by 5 inches in size and the text is assumed to be contained in a large view of 4 page-sized sub-views.

The first step in the printing process is to declare two view objects, called demoView and textView, representing the text and the animation graphic, this is done as follows:

```
TView*          demoView;
TView*          textView;
``` where the * indicates that the declared objects are pointers and TView is a view class.

The next step in the process is to make a printable document folio from the animation views, utilizing the printing interface objects disclosed in detail above. This document folio will include a single page containing the graphics and will be used to create a larger multi-page folio which contains both the text and the animation graphics. This next step is accomplished by obtaining a printer object which specifies a particular printer this is done as follows:

```
TPrinter         printer;
```

The next step is to create a page description for the view. It is possible to get a page description from the printer which indicates the printable area of the printer, however, it is also possible to construct a page description means of rectangular area this is done as follows:

```
TPageDescription
        demoPage(TPageBounds(TGRect(TGPoint(0,0),
                 TGPoint(298,370)),
    TGRect(TGPoint(0,0),
                 TGPoint(288,360));
``` where TPageBounds is an object that determines the page size and printable area. It accepts two rectangular area specifications. TGRect is an object that creates and handles rectangular areas and TGPoint is another object that handles pairs of numbers. The rectangular area created by TGRect is defined by two points corresponding to the upper left hand corner and the lower right hand corner. Thus, the two rectangular areas created by the two TGRect objects correspond to the page size (rectangle [0,0; 298,370]) and the printable area (rectangle [0,0; 288,360]. Therefore, the page description corresponds to a page description whose physical size is slightly larger than the view and whose printable rectangle is just the view. Now, the page description can be made printable utilizing the page description and the view. This can be done using a tiled page folio object to represent the page. The tiled page folio object (called demoTiledPage-Folio) is created by calling its constructor as follows:

```
            TTiledPageFolio
                  demoTiledPageFolio(demoPage,
                                      demoView);
```

This instruction causes the tiled page folio object to instantiate a paginator object, as described above, using the printable rectangle of the page. The same process can be performed for the text view except that the text consists of several internal views within a standard 8.5 by 11 inch format. For purposes of illustration, we will assume that there are page-sized views within the text, each separated by another by 0.5 inch gap. In this case, it is necessary to create a new page description which indicates the arrangement of the text page, and, in this particular case, the text page arrangement can be obtained from the printer by retrieving a default page description as shown in the next code line:

```
TPageDescription
         textPage(printer.GetDefaultPageDescription( ));
```

In order to create a text folio page, another tiled page folio object is created as follows:

```
   TTiledPageFolio      demoTextPages(textPage, textView
                              TRUE, TGPoint::kOrigin,
                              TGPoint::kOrigin,
   TGPoint(0,26));
``` where the function TGPoint::kOrigin creates a TGPoint object consisting of the point (0,0). The Tiled page folio object creates a filed page folio object and specifies that there should be no partial pages used, there is no upper left offset, no lower right offset and the gap is (0, 0.5). The active page area used for pagination is the physical area by default.

At this stage, there are two filed page folio objects which are separate and they need to be combined to form one object. This can be done by using a compound page folio object which can be created by calling its constructor as follows:

```
     TCompoundPageFolio         animationFolio;
```

The compound page folio object is initially empty so that it is necessary to add the pages as needed. The first thing to do is to add the four pages of the animation as follows:
animationFolio.AddPages(&demoTiledPageFolio);
animationFolio.AddPages(&demoTiledPageFolio);
animationFolio.AddPages(&demoTiledPageFolio);
animationFolio.AddPages(&demoTiledPageFolio);

Next it is necessary to use a page compositor object to get all of these four pages onto one page. This can be done by using a 4-up page compositor object which is created as follows:

```
         TNup            fourUp(&animationFolio,
            TULongPair(2,2));
``` where the object TULongPair is an object that handles pairs of long integers. The two numbers specified are the number of rows and the number of columns. Thus, the page compositor object creates an N-up printing arrangement with two rows and two columns. Next, the pages can be combined with the text to make a single document folio, this can be used by creating another compound page folio and adding the animation pages and the text pages as follows:

TCompoundPageFolio brochureFolio;
brochureFolio.AddPages(&fourUp);
brochureFolio.AddPages(&demoTextPages);

At this point, the document folio is finished and can be printed. For illustration purposes, assume that the second page of text is not desired in the printed output. As previously mentioned, a document folio can be printed directly, however, when this is done, all of the pages print. Since there is no desire to print page 2 of the text, it is necessary to create a page iterator. This is done by using the CreatePageIterator routine in the document folio as follows:

```
       TPageIterator       demoIterator =
           brochure.Folio.CreatePageIterator( );
```

Then the document page range can be set to exclude the second page of the text. Since the document page range always is defaulted to the entire folio, all that is necessary is to remove page 3 (the first page is the animation page), which can be done using a Difference function in the underlying page range object as follows:

demoIterator→GetPageRange→Difference(3);

Finally, the document can be printed by creating a print channel and then passing the document to the print channel. The result is a 4-page brochure in which the first page is a 4-up composite and the rest of the pages are pages of text with the second page of text left out.

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A computer system for controlling a print device to generate a printed output having a format, the computer system comprising:

(a) an application program for generating printable information;

(b) storage apparatus;

(c) a processor for storing the printable information in the storage apparatus and retrieving the printable information from the storage apparatus;

(d) an operating system stored in the storage apparatus and cooperating with the processor for controlling the print device; and (e) a first printing interface object created by the application program from commands and functions stored in the operating system, the printing interface object controlling the processor to manipulate the printable information received from the application program to change the format of the printed output.

2. A computer system as recited in claim 1 wherein the first printing interface object controls the processor to manipulate the printable information received from the application program to generate printable information with a first format and the computer system further comprises a second printing interface for controlling the processor to manipulate the printable information received from the application program to generate printable information with a second format.

3. A computer system as recited in claim 2 wherein the first printing interface object controls the processor to paginate the printable information received from the application program to produce paginated printable information.

4. A computer system as recited in claim 3 wherein the second printing interface object controls the processor to produce an n-up printing arrangement from the paginated printable information received from the first printing interface object.

5. A computer system as recited in claim 3 wherein the second printing interface object controls the processor to produce an imposition printing arrangement from the paginated printable information received from the first printing interface object.

6. A computer system as recited in claim 3 wherein the paginated printable information has an order and the first printing interface object comprises means for creating a page iterator object which can rearrange the order of the paginated printable information.

7. A computer system as recited in claim 2, further comprising a third printing interface object which is responsive to the printable information with a first format and to the printable information with a second format for combining the printable information with the first format and the printable information with the second format into a single document.

8. A computer system as recited in claim 2, wherein the first printing interface object is derived from a polymorphic paginator object which is responsive to a predetermined set of parameters received from the application program for paginating the printable information in a format selected from a predetermined plurality of formats.

9. A computer system as recited in claim 8, wherein pagination is conducted in a predetermined order and the polymorphic paginator object comprises means for creating a paginator iterator which is responsive to the printable information for changing the predetermined pagination order.

10. A computer system as recited in claim 9, wherein the paginator iterator comprises means for creating a scan order object which determines a raster scan order for changing the predetermined pagination order.

11. A computer system as recited in claim 9, wherein the paginated printable information has an order and the first printing interface object comprises means for creating a page iterator object which can rearrange the order of the paginated printable information and wherein the page iterator object is derived from the paginator iterator object.

12. A computer system for controlling a print device to generate a printed output having a format, comprising:

(a) an application program for generating printable information;

(b) storage apparatus;

(c) a processor for storing the printable information in the storage apparatus and retrieving the printable information from the storage apparatus;

(d) interface apparatus connected to the print device and responsive to the printable information for controlling the print device to print;

(e) an operating system stored in the storage apparatus and cooperating with the processor for transferring the printable information from the storage apparatus to the interface apparatus, said operating system comprising printing commands and functions; and (f) a first printing interface object created by the application program from the printing commands and functions comprising the operating system, the printing interface object controlling the processor to manipulate the printable information retrieved from the storage apparatus before the printable information is provided to the interface apparatus in order to change the format of the printed output.

13. A computer system as recited in claim 12, wherein the first printing interface object controls the processor to retrieve the printable information from the storage apparatus in pieces of pre-determined size in order to produce paginated printable information.

14. A computer system as recited in claim 13, wherein the first printing interface object comprises means responsive to parameters received from the application program for determining the size of the pieces.

15. A computer system as recited in claim 14, wherein the parameters received from the application program comprise an overall size of the printable information and a total number of pieces.

16. A computer system as recited in claim 14, wherein the parameters received from the application program further comprise a width of gaps desired between pieces and a margin size.

17. A computer system as recited in claim 13, further comprising a second printing interface object responsive to paginated printable information received from the first printing interface object for controlling the processor to combine a predetermined number of pieces into a single document.

18. A computer system as recited in claim 17, wherein the second printing interface object comprises means for arranging the pieces in the document so that each piece has the same relative orientation with respect to the other pieces.

19. A computer system as recited in claim 17, wherein the second printing interface object comprises means for arranging the pieces in the document so that each piece has a different relative orientation with respect to the other pieces in order to allow the document to be cut and folded to produce a printed document.

20. A computer system as recited in claim 13, wherein the first printing interface object comprises means for creating a first page iterator object which can transfer the pieces between the storage apparatus and the interface apparatus in a first predetermined order.

21. A computer system as recited in claim 20, further comprising:

(a) a second printing interface object created by the application program from the printing commands and functions comprising the operating system, the printing interface object controlling the processor to manipulate the printable information retrieved from the storage apparatus before the printable information is provided to the interface apparatus in order to change the format of the printed output; and (b) a third printing interface object which is responsive to first printable information produced by the first printing interface object and to second printable information produced by the second printing interface object for combining the first and second printable information into a single document.

22. A computer system as recited in claim 21, wherein the second printing interface object comprises means for creating a second page iterator object which can transfer the pieces between the storage apparatus and the interface apparatus in a second predetermined order and the third printing interface object comprises a queue object for temporarily storing the first and the second page iterators.

23. A computer system as recited in claim 20, wherein the pieces are retrieved from the storage apparatus in a predetermined order and the first printing interface object comprises means for creating a paginator iterator which is responsive to commands received from the application program for changing the predetermined retrieval order.

24. A computer system as recited in claim 23, wherein the paginator iterator comprises means for creating a scan order object which determines a raster scan order for changing the predetermined retrieval order.

25. A computer system as recited in claim 23, wherein the page iterator object is derived from the paginator iterator object so that the paginator iterator is automatically created when the page iterator object is created.

26. A method for controlling a print device by means of a computer system having an application program and an operating system in order to generate a printed output having a format, the method comprising the steps of:

(a) generating printable information at a predetermined location by means of the application program;

(b) creating a first printing interface object from commands and functions stored in the operating system;

(c) passing the predetermined location of the printable information to the first printing interface object;

(d) using the first printing interface object to manipulate the printable information to format the printable information in a first format; and (e) forwarding the formatted printable information to the print device for printing.

27. A method as recited in claim 26, wherein step (d) comprises the step of (d1) paginating the printable information to produce paginated printable information.

28. A method as recited in claim 27, wherein step (d) comprises the step of (d2) producing an n-up printing arrangement from the paginated printable information.

29. A method as recited in claim 27, wherein step (d) comprises the step of (d3) producing an imposition printing arrangement from the paginated printable information.

30. A method as recited in claim 26, wherein step (b) comprises the step of (b1) creating a page iterator object which can rearrange the order of the paginated printable information; and step (d) comprises the step of (d4) using the page iterator object created in step (b1) to paginate the printable information in a predetermined order.

31. A method as recited in claim 26, further comprising the steps of:

(f) creating a second printing interface object from commands and functions stored in the operating system;

(g) passing the predetermined location of the printable information to the second printing interface object; and (h) using the second printing interface object to manipulate the printable information to format the printable information in a second format.

32. A method as recited in claim 31, further comprising the steps of:

(i) creating a third printing interface object;

(j) providing the printable information with the first format to the third printing interface object;

(k) providing the printable information with the second format to the third printing interface object; and (l) using the third printing interface object to combine the printable information with the first format and the printable information with the second format into a single document.

33. A method as recited in claim 26, wherein step (b), comprises the step of (b2) deriving the first printing interface object from a polymorphic paginator object which is responsive to a predetermined set of parameters received from the application program for paginating the printable information in a format selected from a predetermined plurality of formats.

34. A method as recited in claim 33, wherein step (b2), comprises the step of (b2a) creating a paginator iterator object for paginating the printable information in a predetermined pagination order.

35. A method as recited in claim 34, wherein step (b2) comprises the step of (b2b) creating a scan order object which determines a raster scan order for changing the predetermined pagination order.

36. A method as recited in claim 35, further comprising the step of (m) deriving a page iterator object which can rearrange the order of the paginated printable information from the paginator iterator object.

37. A method for generating a printing interface for an application program which cooperates with an operating system in order to manipulate printable information to generate printable information with a format, the method comprising the steps of:

(a) creating a first printing interface class including pagination commands and functions in the operating system;

(b) referencing the first printing interface class in the application program to create a first printing interface object derived from the first printing interface class; and (c) creating an instance of the first printing interface object to manipulate the printable information to generate printable information formatted into a plurality of pages.

38. A method as recited in claim 37, wherein step (a) comprises the step of (a1) creating the first printing interface class as a polymorphic class which paginates the printable information in a manner determined by parameters received from the application program.

39. A method as recited in claim 37, wherein step (a) comprises the step of (a2) creating the first printing interface class which includes at least one function that creates a page iterator object which can sequence through the plurality of pages of the formatted printable information.

40. A method as recited in claim 39 wherein step (b) comprises the step of (b1) referencing the first printing interface class in the application program and providing predetermined parameters to create a first printing interface object derived from the first printing interface class which paginates the printable information in a predetermined manner.

41. A method as recited in claim 40, further comprising the steps of:

(d) creating a second printing interface class including a queue structure for storing page iterator objects and functions for manipulating the queue structure in the operating system;

(e) referencing the second printing interface class in the application program to create a second printing interface object derived from the second printing interface class; and (f) creating an instance of the second printing interface object to further manipulate the formatted printable information generated in step (c).

42. A method as recited in claim 41, further comprising the steps of:

(g) creating a third printing interface class in the operating system, the third printing interface class including commands and functions for further manipulating the plurality of pages in the formatted printable information;

(h) referencing the third printing interface class in the application program to create a third printing interface object derived from the third printing interface class; and (i) creating an instance of the third printing interface object to further manipulate the formatted printable information generated in step (f).

43. A method as recited in claim 42, wherein step (g) comprises the step of (g1) including commands and functions for creating an n-up print arrangement from the plurality of pages in the formatted printable information in the third printing interface class.

44. A method as recited in claim 43, wherein step (g1) comprises the step of (g1a) including a command for translating each of the plurality of pages in the formatted printable information to a predetermined position.

45. A method as recited in claim 42, wherein step (g) comprises the step of (g2) creating a third printing interface class in the operating system, the third printing interface class including commands and functions for creating an imposition print arrangement from the plurality of pages in the formatted printable information.

46. A method as recited in claim 44, wherein step (g2) comprises the steps of including a command for translating each of the plurality of pages in the formatted printable information to a predetermined position and a command for rotating each of the plurality of pages in the formatted printable information to a predetermined position.

* * * * *